US010654331B2

(12) United States Patent
Murakami et al.

(10) Patent No.: US 10,654,331 B2
(45) Date of Patent: May 19, 2020

(54) VEHICLE HEIGHT ADJUSTMENT DEVICE

(71) Applicant: Showa Corporation, Gyoda (JP)

(72) Inventors: Yosuke Murakami, Haga-gun (JP);
Hiroyuki Miyata, Haga-gun (JP);
Fumiaki Ishikawa, Haga-gun (JP)

(73) Assignee: Showa Corporation, Gyoda (JP)

( * ) Notice: Subject to any disclaimer, the term of this patent is extended or adjusted under 35 U.S.C. 154(b) by 282 days.

(21) Appl. No.: 15/752,811

(22) PCT Filed: Mar. 7, 2017

(86) PCT No.: PCT/JP2017/009080
§ 371 (c)(1),
(2) Date: Feb. 14, 2018

(87) PCT Pub. No.: WO2018/163302
PCT Pub. Date: Sep. 13, 2018

(65) Prior Publication Data
US 2019/0001776 A1 Jan. 3, 2019

(30) Foreign Application Priority Data
Mar. 6, 2017 (JP) .................................. 2017-041754

(51) Int. Cl.
*B60G 17/016* (2006.01)
*B60G 17/015* (2006.01)
(Continued)

(52) U.S. Cl.
CPC ......... *B60G 17/016* (2013.01); *B60G 17/015* (2013.01); *B60G 17/044* (2013.01);
(Continued)

(58) Field of Classification Search
CPC .. B60G 17/016; B60G 17/015; B60G 17/044; B60G 17/08; B60G 2204/62;
(Continued)

(56) References Cited

U.S. PATENT DOCUMENTS 4,775,025 A * 10/1988 Parker .................. B62K 25/005
180/219
5,201,384 A * 4/1993 Kiyota ................. B60G 17/033
180/219

(Continued)

FOREIGN PATENT DOCUMENTS

JP     08-22680 B    3/1996
JP   2001-199356 A   7/2001

(Continued)

OTHER PUBLICATIONS

International Search Report and Written Opinion dated May 16, 2017 for the corresponding PCT Application No. PCT/JP2017/009080.

*Primary Examiner* — Marthe Y Marc-Coleman
(74) *Attorney, Agent, or Firm* — Leason Ellis LLP

(57) ABSTRACT

A vehicle height adjustment device includes front forks, a rear suspension, a weight estimation unit, and a front wheel-side target movement amount determination unit. The front fork includes a front wheel-side suspension spring and a front wheel-side support member, which supports one end of the front wheel-side suspension spring, and moves toward another end of the front wheel-side spring to change the front wheel-side suspension spring length. The rear suspension includes a rear wheel-side suspension spring and a rear wheel-side support member, which supports one end of the rear wheel-side suspension spring, and moves toward another one end of the rear wheel-side spring to change the rear wheel-side suspension spring length. The weight estimation unit estimates a weight applied to a vehicle. The front wheel-side target movement amount determination unit decreases, a movement amount of the front wheel-side support member as the estimated weight increases.

12 Claims, 19 Drawing Sheets

(51) Int. Cl.
*B60W 40/13* (2012.01)
*B60G 17/08* (2006.01)
*F16F 9/46* (2006.01)
*F16F 9/56* (2006.01)
*F16F 9/32* (2006.01)
*B62K 25/04* (2006.01)
*B60G 17/044* (2006.01)

(52) U.S. Cl.
CPC .............. *B60G 17/08* (2013.01); *B60W 40/13* (2013.01); *B62K 25/04* (2013.01); *F16F 9/32* (2013.01); *F16F 9/46* (2013.01); *F16F 9/56* (2013.01); *B60G 2204/62* (2013.01); *B60G 2300/12* (2013.01); *B60G 2400/60* (2013.01); *B60G 2500/30* (2013.01); *B60G 2800/01* (2013.01); *B62K 2025/044* (2013.01); *B62K 2025/045* (2013.01)

(58) Field of Classification Search
CPC ............ B60G 2300/12; B60G 2400/60; B60G 2800/01; B60W 40/13; B62K 25/04; B62K 2025/044; B62K 2025/045; F16F 9/32; F16F 9/46; F16F 9/56
See application file for complete search history.

(56) References Cited

U.S. PATENT DOCUMENTS

| | | | |
|---|---|---|---|
| 5,211,420 A * | 5/1993 | Iwashita | B60G 15/063 180/219 |
| 9,713,945 B1 * | 7/2017 | Arnott | B60G 15/061 |
| 2001/0008985 A1 | 7/2001 | Wada | |
| 2015/0076773 A1 * | 3/2015 | Kasuga | B60G 17/0272 280/5.514 |
| 2015/0239526 A1 | 8/2015 | Ishikawa et al. | |

FOREIGN PATENT DOCUMENTS

| | | |
|---|---|---|
| JP | 2006-218911 A | 8/2006 |
| JP | 2006-335156 A | 12/2006 |
| JP | 2015-160501 A | 9/2015 |

* cited by examiner

FIG. 3A
Compression stroke
FIG. 3B
Rebound stroke
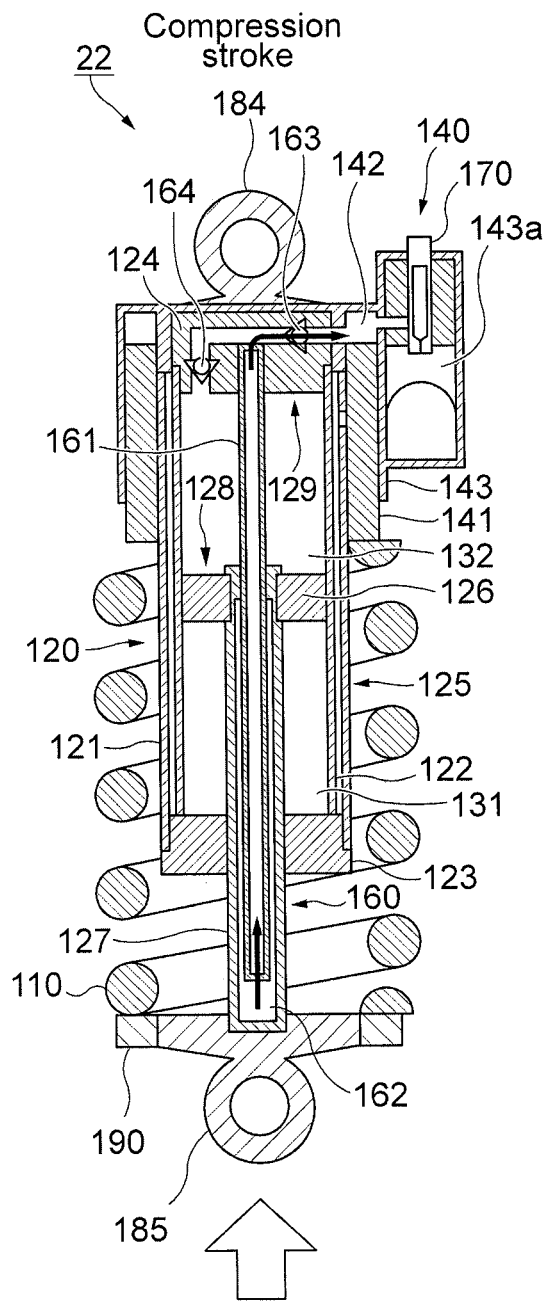
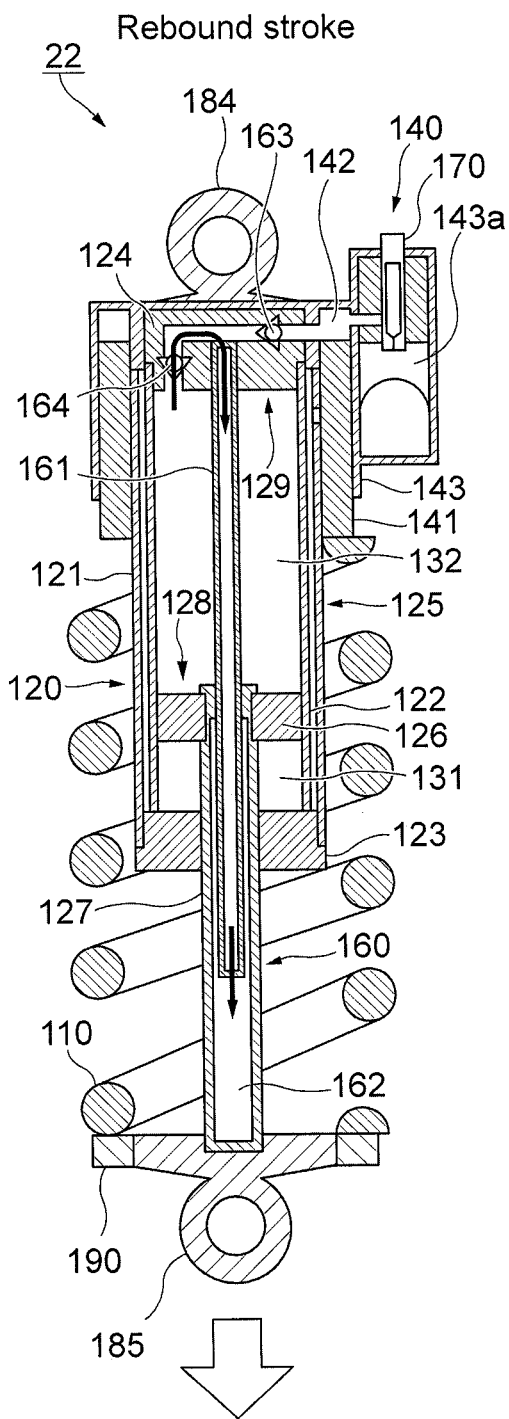

FIG. 8A
Compression stroke
FIG. 8B
Rebound stroke
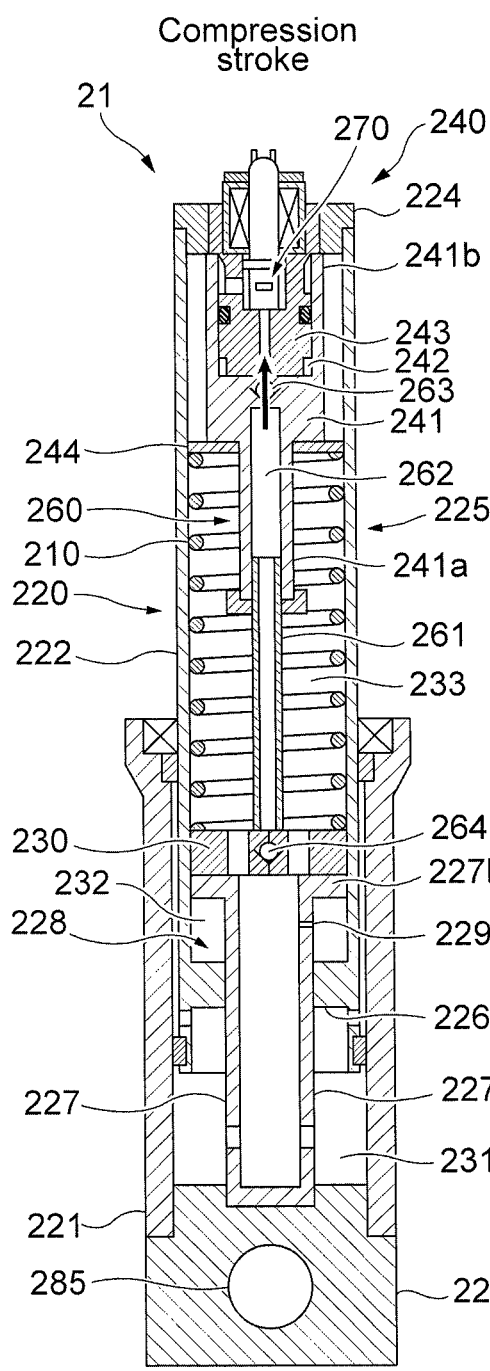
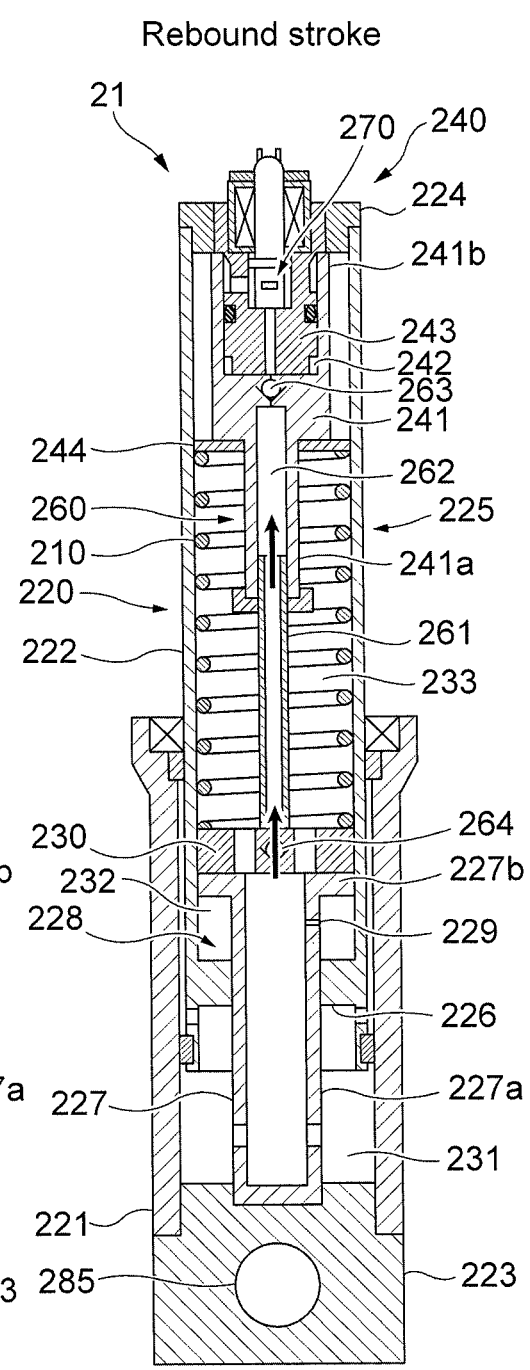

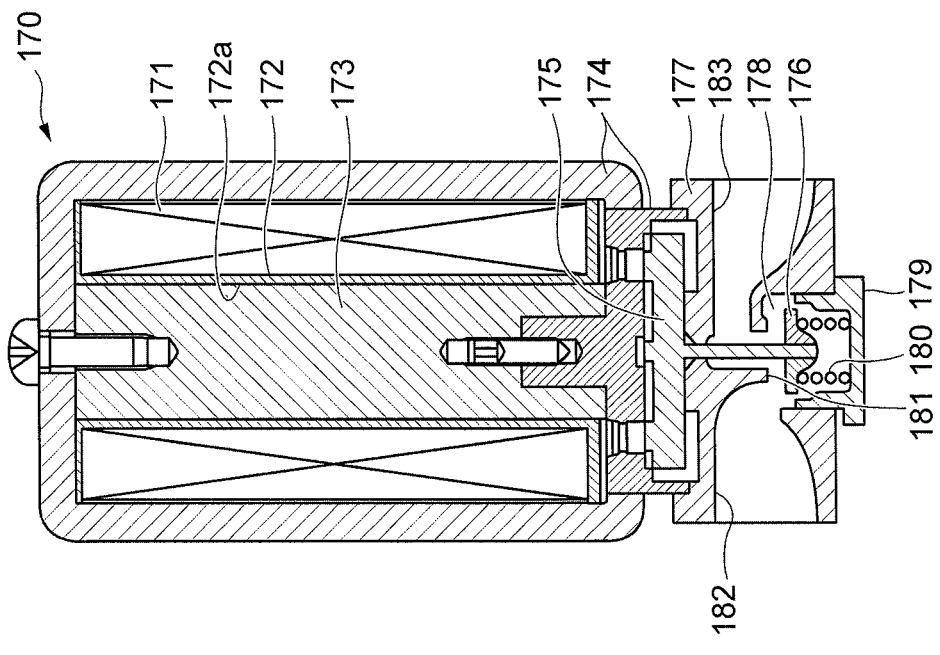
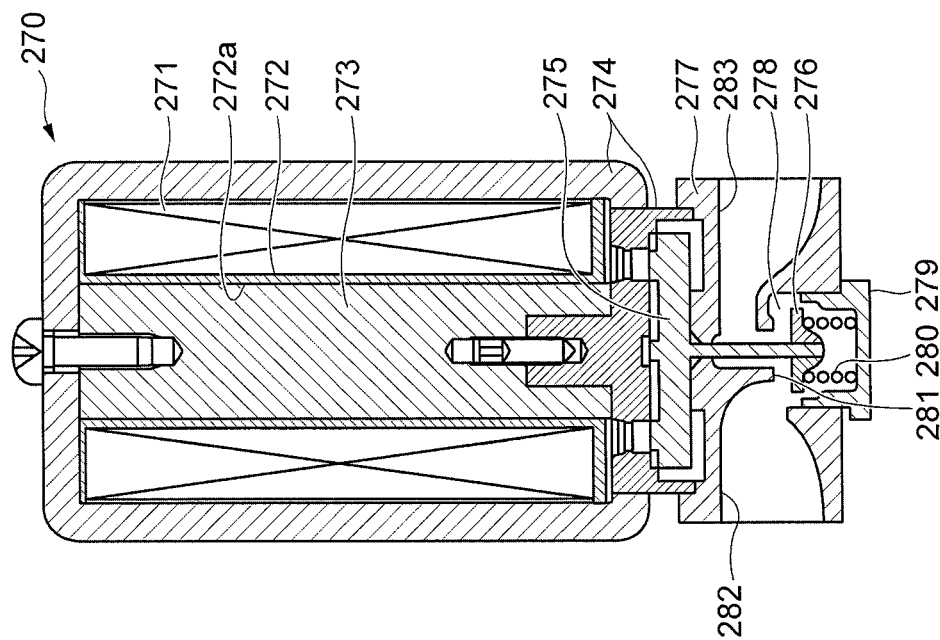
FIG. 11A
FIG. 11B

VEHICLE HEIGHT ADJUSTMENT DEVICE

CROSS-REFERENCE TO RELATED PATENT APPLICATIONS

This application is a U.S. National Phase Application under 35 U.S.C. § 371 of International Patent Application No. PCT/JP2017/009080, filed Mar. 7, 2017, and claims the benefit of Japanese Patent Application No. 2017-041754, filed Mar. 6, 2017, all of which are incorporated by reference in their entireties herein.

FIELD OF THE INVENTION

The present invention relates to a vehicle height adjustment device that adjusts the vehicle height of a motorcycle.

BACKGROUND OF THE INVENTION

Japanese Examined Patent Publication No. 8-22680 discloses a vehicle height adjustment device that increases the height of a motorcycle during travel and that decreases the height of the motorcycle during halt in order to facilitate a rider's or a passenger's getting on and off the motorcycle.

The vehicle height adjustment device automatically changes the height of the motorcycle in response to its speed of travel. Specifically, the vehicle height adjustment device automatically increases the vehicle height when the vehicle speed reaches a set speed, and automatically decreases the vehicle height when the vehicle speed becomes equal to or lower than a set speed.

Problems to be Solved by the Invention

To attain a target vehicle height, such a mechanism is required that adjusts the vehicle height in accordance with a weight applied to a motorcycle. One idea for the mechanism is to estimate the weight applied to the motorcycle based on a change in length of a rear wheel-side suspension device to control a length of a front wheel-side suspension device based on the estimated weight, for example. However, precisely estimating the weight has been difficult when the length of the rear wheel-side suspension device varies depending on whether a rider rides a motorcycle solely, or the rider rides the motorcycle with a passenger on its tandem seat, or with a load on its carrier, even when a total weight applied to the motorcycle is identical. If a wrong weight has been estimated, and the length of the front wheel-side suspension device has been controlled based on the erroneously estimated weight, a difference between a front wheel-side height and a rear wheel-side height of the body may not reach a desired difference, and thus the motorcycle may not attain a desired vehicle posture. If the motorcycle has failed to attain the desired vehicle posture, the rider may not able to ride the motorcycle stably, as well as an optical axis of the head lamp may be affected.

The present invention has an object to provide a vehicle height adjustment device capable of precisely adjusting a vehicle posture.

SUMMARY OF THE INVENTION

Means of Solving the Problems

According to one aspect of the present invention, a vehicle height adjustment device includes a front wheel-side suspension device, a rear wheel-side suspension device, a weight estimation unit, and a front wheel-side movement amount control unit. The front wheel-side suspension device includes a front wheel-side spring and a front wheel-side support member. The front wheel-side spring is disposed between a body of a vehicle and a front wheel. The front wheel-side support member supports one end of the front wheel-side spring, and is configured to move toward another one end of the front wheel-side spring to change a length of the front wheel-side spring. The rear wheel-side suspension device includes a rear wheel-side spring and a rear wheel-side support member. The rear wheel-side spring is disposed between the body and a rear wheel. The rear wheel-side support member supports one end of the rear wheel-side spring, and is configured to move toward another one end of the rear wheel-side spring to change a length of the rear wheel-side spring. The weight estimation unit is configured to estimate a weight applied to the vehicle based on a length of the rear wheel-side suspension device and a movement amount of the rear wheel-side support member. The front wheel-side movement amount control unit is configured to decrease, when the weight estimated by the weight estimation unit is equal to or larger than a predetermined weight, a movement amount of the front wheel-side support member as the estimated weight increases.

Effects of the Invention

The present invention can provide a vehicle height adjustment device capable of precisely adjusting a vehicle posture.

BRIEF DESCRIPTION OF THE DRAWINGS

FIGS. 3A and 3B illustrate how a rear wheel-side fluid supply device operates;

FIGS. 8A and 8B illustrate how a front wheel-side fluid supply device operates;

FIG. 11A illustrates a schematic configuration of a front wheel-side electromagnetic valve, and FIG. 11B illustrates a schematic configuration of a rear wheel-side electromagnetic valve;

DETAILED DESCRIPTION OF THE INVENTION

The embodiments of the present invention will now be described herein in detail with reference to the accompanying drawings.

Figure 1:
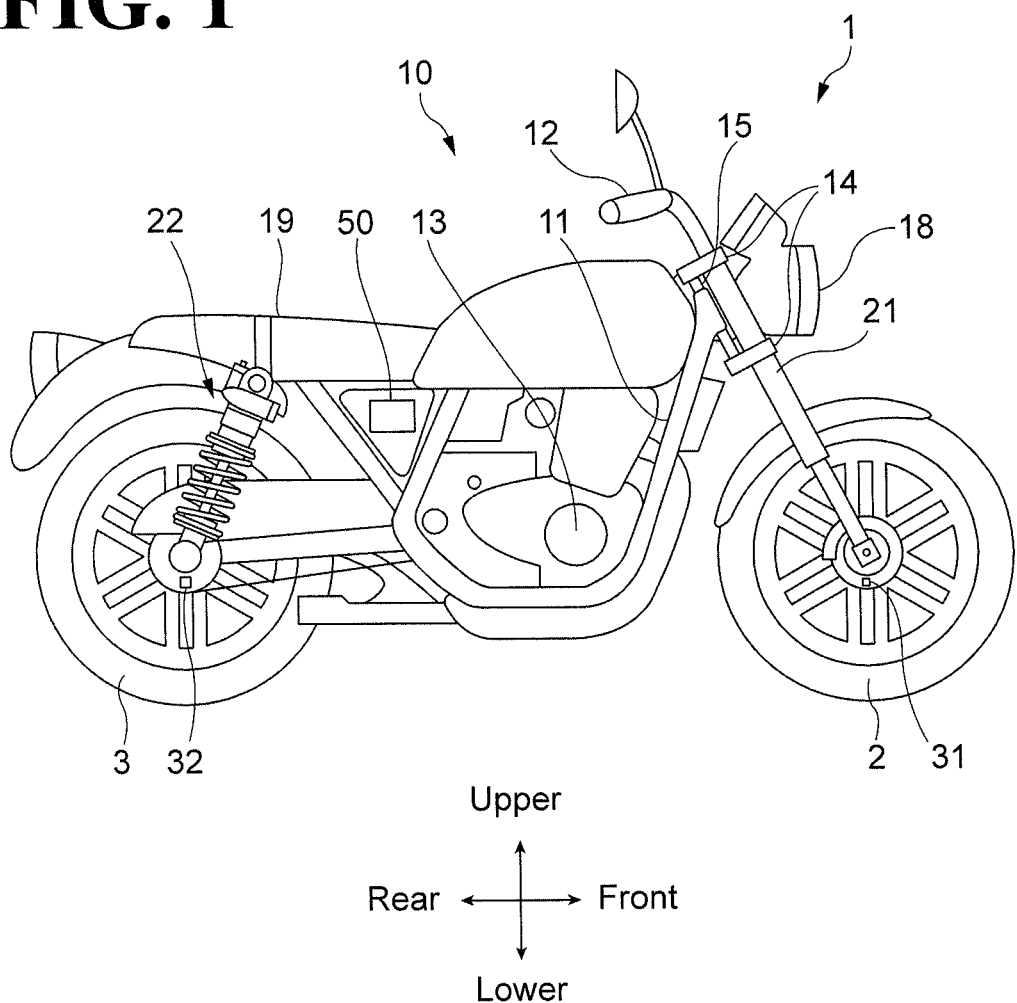
FIG. 1 illustrates a schematic configuration of a motorcycle according to an embodiment.

FIG. 1 illustrates a schematic configuration of a motorcycle 1 according to this embodiment.

The motorcycle 1 includes a front wheel 2, a rear wheel 3, and a body 10. The front wheel 2 is a wheel on the front side of the motorcycle 1. The rear wheel 3 is a wheel on the rear side of the motorcycle 1. The body 10 includes a body frame 11, a handle 12, an engine 13, a head lamp 18, and a seat 19. The body frame 11 defines a framework of the motorcycle 1.

The motorcycle 1 includes front forks 21. The front forks 21 are examples of front wheel-side suspension devices that couple the front wheel 2 and the body 10 to each other. The motorcycle 1 includes a rear suspension 22. The rear suspension 22 is an example of a rear wheel-side suspension device that couples the rear wheel 3 and the body 10 to each other.

The motorcycle 1 includes two brackets 14 and a shaft 15. The two brackets 14 hold the front forks 21. One of the front forks 21 is disposed on the left side of the front wheel 2. The other one of the front forks 21 is disposed on the right side of the front wheel 2. The shaft 15 is disposed between the two brackets 14. The shaft 15 is rotatably supported by the body frame 11.

The motorcycle 1 includes a front wheel rotation detection sensor 31 and a rear wheel rotation detection sensor 32. The front wheel rotation detection sensor 31 is configured to detect a rotation angle of the front wheel 2. The rear wheel rotation detection sensor 32 is configured to detect a rotation angle of the rear wheel 3.

The motorcycle 1 includes a control device 50. The control device 50 is configured to control a front wheel-side electromagnetic valve 270, described later, for its opening degree, of each of the front forks 21, and a rear wheel-side electromagnetic valve 170, described later, for its opening degree, of the rear suspension 22. The control device 50 receives signals output from the front wheel rotation detection sensor 31 and the rear wheel rotation detection sensor 32, described above, for example. The control device 50 controls the front wheel-side electromagnetic valve 270 and the rear wheel-side electromagnetic valve 170, described later, for their opening degrees, to control the vehicle height of the motorcycle 1 (height of the body 10). The front forks 21, the rear suspension 22, and the control device 50 are examples of vehicle height adjustment devices configured to adjust the vehicle height of the motorcycle 1.

Next, the rear suspension 22 will now be described herein in detail.

Figure 2:
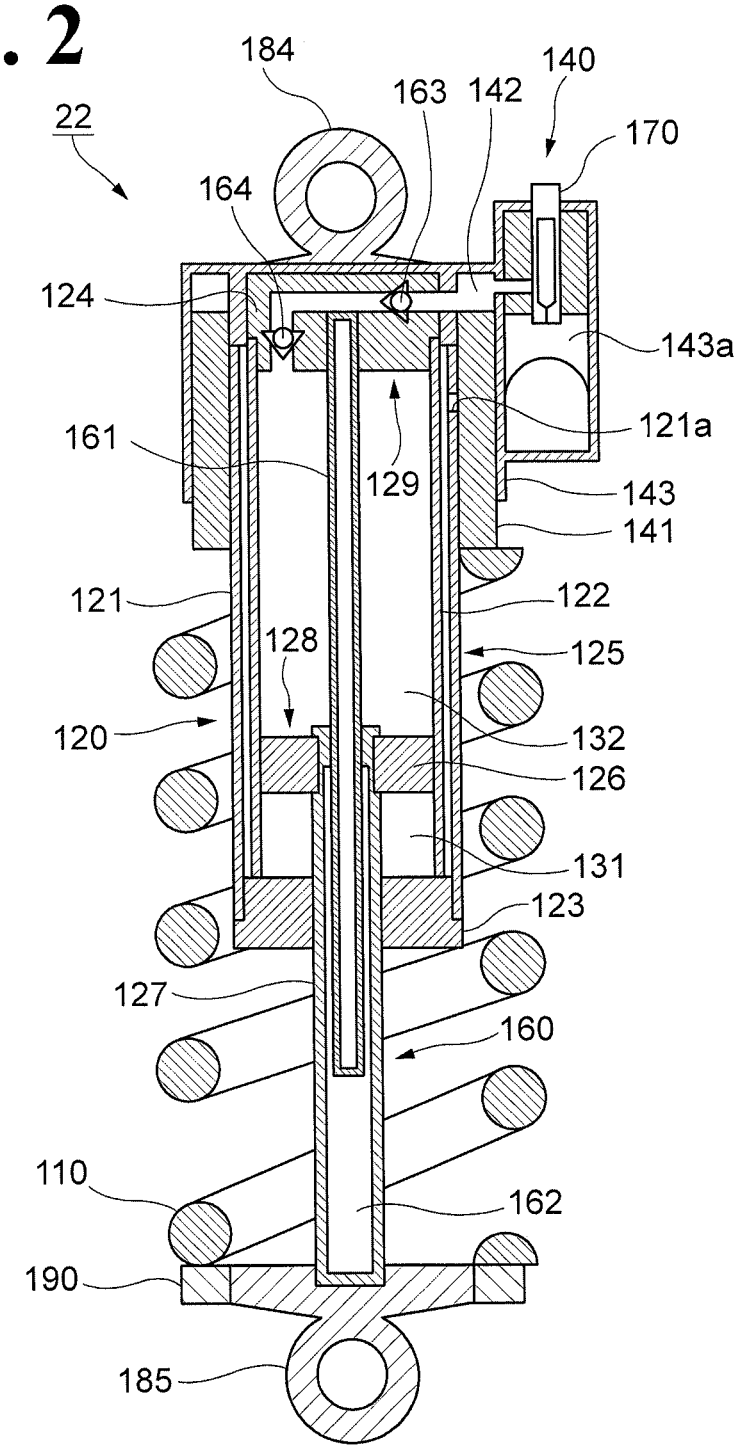
FIG. 2 is a cross-sectional view of a rear suspension.

FIG. 2 is a cross-sectional view of the rear suspension 22.

The rear suspension 22 is attached between the rear wheel 3 and the body 10 representing an example of a body of the motorcycle 1. The rear suspension 22 includes a rear wheel-side suspension spring 110 and a rear wheel-side damper 120. The rear wheel-side suspension spring 110 is an example of a rear wheel-side spring that supports the vehicle weight of the motorcycle 1, and that absorbs shock. The rear wheel-side damper 120 is an example of a rear wheel-side damper that attenuates vibration of the rear wheel-side suspension spring 110. The rear suspension 22 includes a rear wheel-side relative position alteration device 140 and a rear wheel-side fluid supply device 160. The rear wheel-side relative position alteration device 140 is capable of altering a rear wheel-side relative position representing a relative position between the body 10 and the rear wheel 3 by adjusting a spring force of the rear wheel-side suspension spring 110. The rear wheel-side fluid supply device 160 is configured to supply fluid to the rear wheel-side relative position alteration device 140. The rear suspension 22 includes a body-side attaching member 184, an axle-side attaching member 185, and a spring receiver 190. The body-side attaching member 184 is used to attach the rear suspension 22 to the body 10. The axle-side attaching member 185 is used to attach the rear suspension 22 to the rear wheel 3. The spring receiver 190 is attached to the axle-side attaching member 185 to support one end (lower portion in FIG. 2), in a centerline direction, of the rear wheel-side suspension spring 110.

The rear wheel-side damper 120 includes a cylinder 125, as shown in FIG. 2. The cylinder 125 includes an outer cylinder 121, an inner cylinder 122, a bottom cover 123, and a top cover 124. The outer cylinder 121 has a thin, cylindrical shape. The inner cylinder 122 has a thin, cylindrical shape, and is accommodated in the outer cylinder 121. The bottom cover 123 covers one end (lower portion in FIG. 2), in the centerline direction (upper-lower direction in FIG. 2), of the cylindrical shape of the outer cylinder 121 having the cylindrical shape. The top cover 124 covers another one end (upper portion in FIG. 2), in the centerline direction, of the inner cylinder 122. The centerline direction of the cylindrical shape of the outer cylinder 121 will be hereinafter occasionally referred to as "centerline direction."

The rear wheel-side damper 120 includes a piston 126 and a piston rod 127. The piston 126 is movably inserted into the inner cylinder 122 in the centerline direction. The piston rod 127 extends in the centerline direction and supports the piston 126 at another one end (upper end in FIG. 2) in the centerline direction. The piston 126 is in contact with an inner surface of the inner cylinder 122, and separates a space in the cylinder 125, in which fluid (oil in this embodiment) is filled, into a first oil chamber 131 and a second oil chamber 132. The first oil chamber 131 faces one end, in the centerline direction, of the piston 126. The second oil chamber 132 faces another one end, in the centerline direction, of the piston 126. The piston rod 127 is a member having a cylindrical shape into which a pipe 161, described later, is inserted. In this embodiment, oil functions as an example of operating oil.

The rear wheel-side damper 120 includes a first damping force generation device 128 and a second damping force generation device 129. The first damping force generation device 128 is disposed on another one end side, in the centerline direction, of the piston rod 127. The second damping force generation device 129 is disposed on another one end side, in the centerline direction, of the inner cylinder 122. The first damping force generation device 128 and the second damping force generation device 129 attenuate stretching vibration that occurs between the cylinder 125 and the piston rod 127 when the rear wheel-side suspension spring 110 absorbs an impact force applied from a ground surface. The first damping force generation device 128 is disposed so as to function as a connection passage between the first oil chamber 131 and the second oil chamber 132. The second damping force generation device 129 is disposed so as to function as a connection passage between the second oil chamber 132 and a jack chamber 142, described later, of the rear wheel-side relative position alteration device 140.

The rear wheel-side fluid supply device 160 is a device that pumps along with stretching vibration of the piston rod 127 relative to the cylinder 125 to supply fluid into the jack chamber 142, described later, of the rear wheel-side relative position alteration device 140.

The rear wheel-side fluid supply device 160 includes the pipe 161. The pipe 161 has a cylindrical shape, and is secured to the top cover 124 of the rear wheel-side damper 120 so as to extend in the centerline direction. The pipe 161 is inserted coaxially into a pump chamber 162, that is, into the piston rod 127 having a cylindrical shape.

The rear wheel-side fluid supply device 160 includes a discharge check valve 163 and an intake check valve 164. The discharge check valve 163 allows fluid in the pump chamber 162 compressed when the piston rod 127 enters into the cylinder 125 and the pipe 161 to discharge toward the jack chamber 142, described later. The intake check valve 164 allows fluid in the cylinder 125 to enter into the pump chamber 162 decompressed when the piston rod 127 withdraws from the cylinder 125 and the pipe 161.

FIGS. 3A and 3B illustrate how the rear wheel-side fluid supply device 160 operates.

The rear wheel-side fluid supply device 160 with the configuration described hereinbefore pumps through stretching vibration caused when the rear suspension 22 receives forces from a ground surface due to its roughness as the motorcycle 1 travels, and when the piston rod 127 enters into and withdraws from the cylinder 125 and the pipe 161. During this pumping movement, when the pump chamber 162 is compressed, fluid in the pump chamber 162 opens the discharge check valve 163 to discharge toward the jack chamber 142 of the rear wheel-side relative position alteration device 140 (see FIG. 3A). When the pump chamber 162 is decompressed, fluid in the second oil chamber 132 of the cylinder 125 opens the intake check valve 164 to enter into the pump chamber 162 (see FIG. 3B).

The rear wheel-side relative position alteration device 140 includes a support member 141 and a hydraulic jack 143. The support member 141 is an example of a rear wheel-side support member, and is disposed so as to cover an outer circumference of the cylinder 125 of the rear wheel-side damper 120 to support another one end (upper portion in FIGS. 3A and 3B), in the centerline direction, of the rear wheel-side suspension spring 110. The hydraulic jack 143 is disposed so as to cover the outer circumference on another one end side (upper side in FIGS. 3A and 3B), in the centerline direction, of the cylinder 125 to define the jack chamber 142 together with the support member 141. The support member 141 moves in the centerline direction relative to the hydraulic jack 143, as fluid in the cylinder 125 enters into the jack chamber 142 that is an example of an operating oil chamber, and as the fluid discharges from the jack chamber 142. The hydraulic jack 143 is attached, on its upper portion, with the body-side attaching member 184. As the support member 141 moves in the centerline direction relative to the hydraulic jack 143, the spring force of the rear wheel-side suspension spring 110 changes. As a result, a relative position of the seat 19 changes with respect to the rear wheel 3.

The rear wheel-side relative position alteration device 140 includes the rear wheel-side electromagnetic valve 170. The rear wheel-side electromagnetic valve 170 is an electromagnetic valve (solenoid valve). The rear wheel-side electromagnetic valve 170 is disposed on a fluid flow passage between the jack chamber 142 and a fluid storage chamber 143*a* defined in the hydraulic jack 143. The rear wheel-side electromagnetic valve 170 closes so as to fill fluid supplied to the jack chamber 142 in the jack chamber 142. The rear wheel-side electromagnetic valve 170 opens so as to discharge the fluid supplied to the jack chamber 142 into the fluid storage chamber 143*a* defined in the hydraulic jack 143. The rear wheel-side electromagnetic valve 170 will be described later in detail. The fluid discharged into the fluid storage chamber 143*a* returns into the cylinder 125.

Figure 4A:
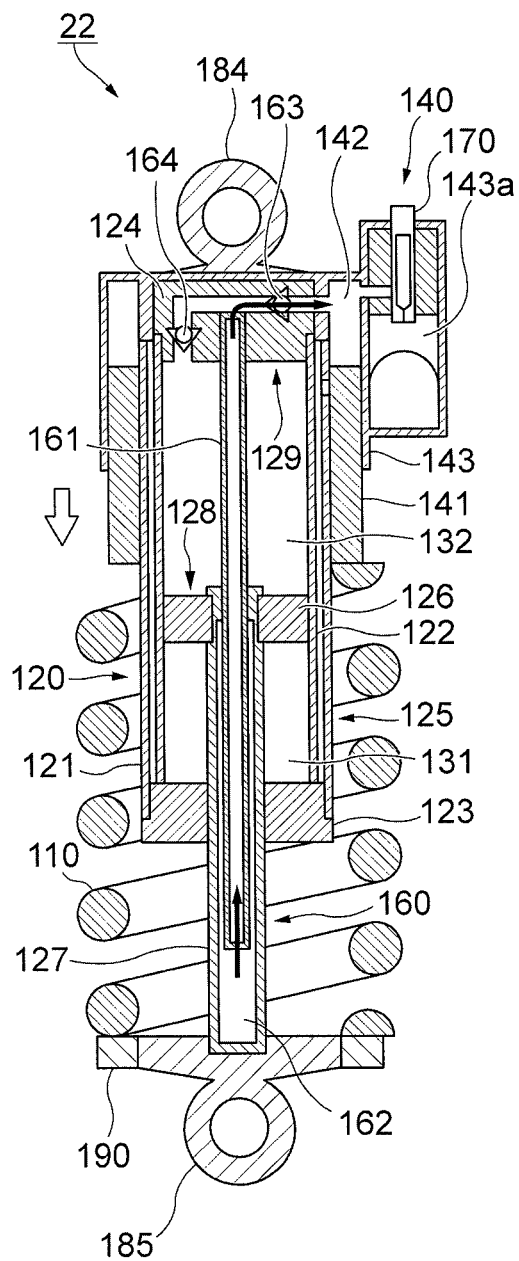
FIGS. 4A and 4B illustrate how a rear wheel-side relative position alteration device adjusts the vehicle height.
Figure 4B:
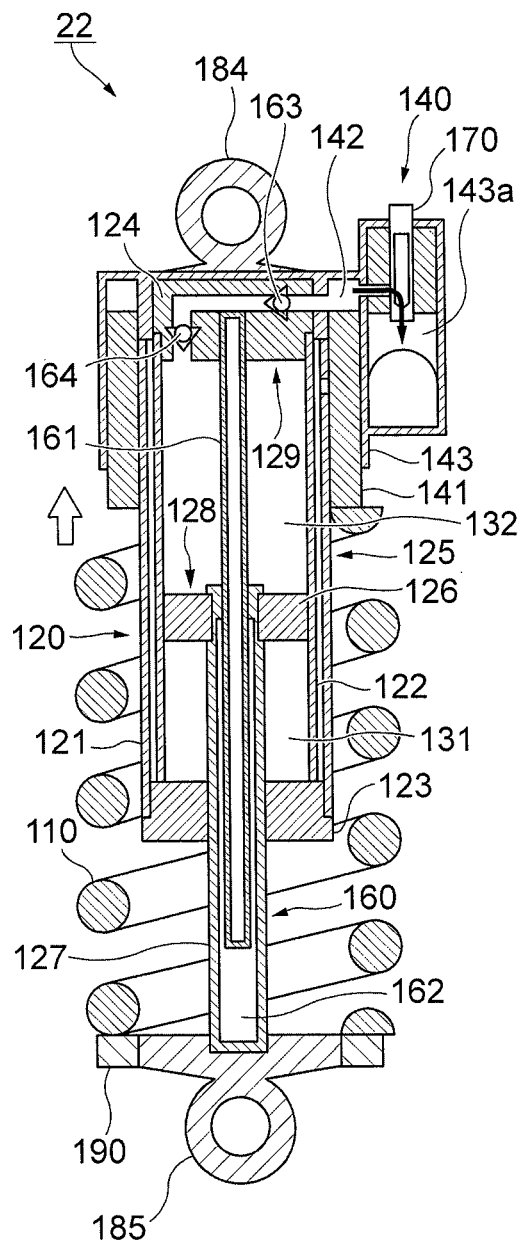

FIGS. 4A and 4B illustrate how the rear wheel-side relative position alteration device 140 adjusts the vehicle height.

Upon the rear wheel-side electromagnetic valve 170 being fully open starts closing, even if only slightly, the rear wheel-side fluid supply device 160 supplies fluid into the jack chamber 142. The fluid is thus filled inside the jack chamber 142. The support member 141 accordingly moves toward one end side (lower side in FIG. 4A) in the centerline direction relative to the hydraulic jack 143 to shorten the rear wheel-side suspension spring 110 in length (see FIG. 4A). Meanwhile, upon the rear wheel-side electromagnetic valve 170 fully opens, fluid in the jack chamber 142 discharges into the fluid storage chamber 143*a*. The support member 141 accordingly moves toward another one end side (upper side in FIG. 4B) in the centerline direction relative to the hydraulic jack 143 to extend the rear wheel-side suspension spring 110 in length (see FIG. 4B).

When the support member 141 moves relative to the hydraulic jack 143 to shorten the rear wheel-side suspension spring 110 in length, the rear wheel-side suspension spring 110 applies to the support member 141 a spring force greater than a spring force applied before the support member 141 moves relative to the hydraulic jack 143. As a result, an initial load changes, under which a relative position between the body 10 and the rear wheel 3 does not change, even when the body 10 applies a force toward the rear wheel 3. In such a case, even when an identical force is applied from the body 10 (seat 19) toward the one end side (lower side in FIGS. 4A and 4B) in the centerline direction, an amount of depression of the rear suspension 22 (change in distance between the body-side attaching member 184 and the axle-side attaching member 185) decreases. Accordingly, when the support member 141 moves relative to the hydraulic jack 143 to shorten the rear wheel-side suspension spring 110 in length, a height of the seat 19 becomes higher (vehicle height increases) than a height before the support member 141 moves relative to the hydraulic jack 143. That is, as the rear wheel-side electromagnetic valve 170 decreases its opening degree, the vehicle height increases.

Meanwhile, when the support member 141 moves relative to the hydraulic jack 143 to extend the rear wheel-side suspension spring 110 in length, the rear wheel-side suspension spring 110 applies to the support member 141 a spring force smaller than a spring force applied before the support member 141 moves relative to the hydraulic jack 143. In such a case, even when an identical force is applied from the body 10 (seat 19) toward the one end side (lower side in FIGS. 4A and 4B) in the centerline direction, an amount of depression of the rear suspension 22 (change in distance between the body-side attaching member 184 and the axle-side attaching member 185) increases. Accordingly, when the support member 141 moves relative to the hydraulic jack 143 to extend the rear wheel-side suspension spring 110 in length, a height of the seat 19 becomes lower (vehicle height decreases) than a height before the support member 141 moves relative to the hydraulic jack 143. That is, as the rear wheel-side electromagnetic valve 170 increases its opening degree, the vehicle height decreases.

The rear wheel-side electromagnetic valve 170 is controlled by the control device 50 for its opening and closing or its opening degree.

Fluid supplied to the jack chamber 142 when the rear wheel-side electromagnetic valve 170 opens may discharge toward the first oil chamber 131 and/or the second oil chamber 132 in the cylinder 125.

As shown in FIG. 2, the outer cylinder 121 of the cylinder 125 is defined with a return passage 121a. Through the return passage 121a, fluid in the jack chamber 142 returns into the cylinder 125 when the support member 141 moves to a predetermined limit position toward the one end side (lower side in FIG. 2) in the centerline direction relative to the hydraulic jack 143.

Figure 5:
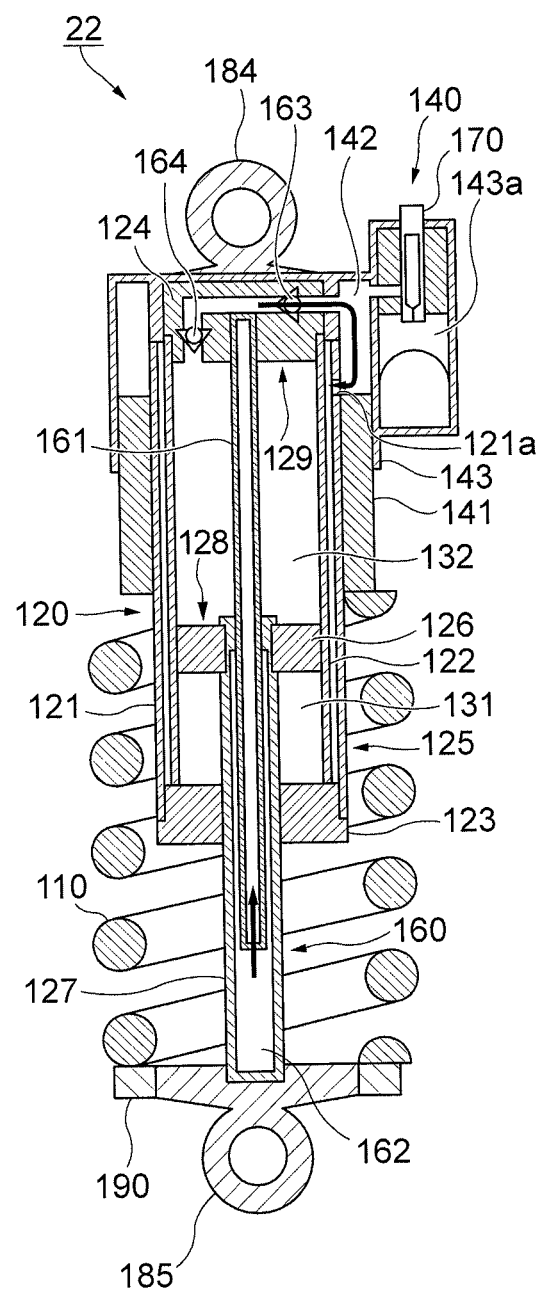
FIG. 5 is a view of a mechanism of how the vehicle height is maintained.

FIG. 5 is a view of a mechanism of how the vehicle height is maintained.

Even when fluid is kept supplied into the jack chamber 142 while the rear wheel-side electromagnetic valve 170 is fully closed, the return passage 121a allows the supplied fluid to return into the cylinder 125, and thus a position of the support member 141 with respect to the hydraulic jack 143, that is, a height of the seat 19 (vehicle height), is maintained.

A state of the rear suspension 22 when the rear wheel-side electromagnetic valve 170 is fully open, and a movement amount of the support member 141 relative to the hydraulic jack 143 is minimum (zero) will hereinafter be referred to as a minimum state, and a state of the rear suspension 22 when the rear wheel-side electromagnetic valve 170 is fully closed, and a movement amount of the support member 141 relative to the hydraulic jack 143 is maximum will hereinafter be referred to as a maximum state.

Figure 12:
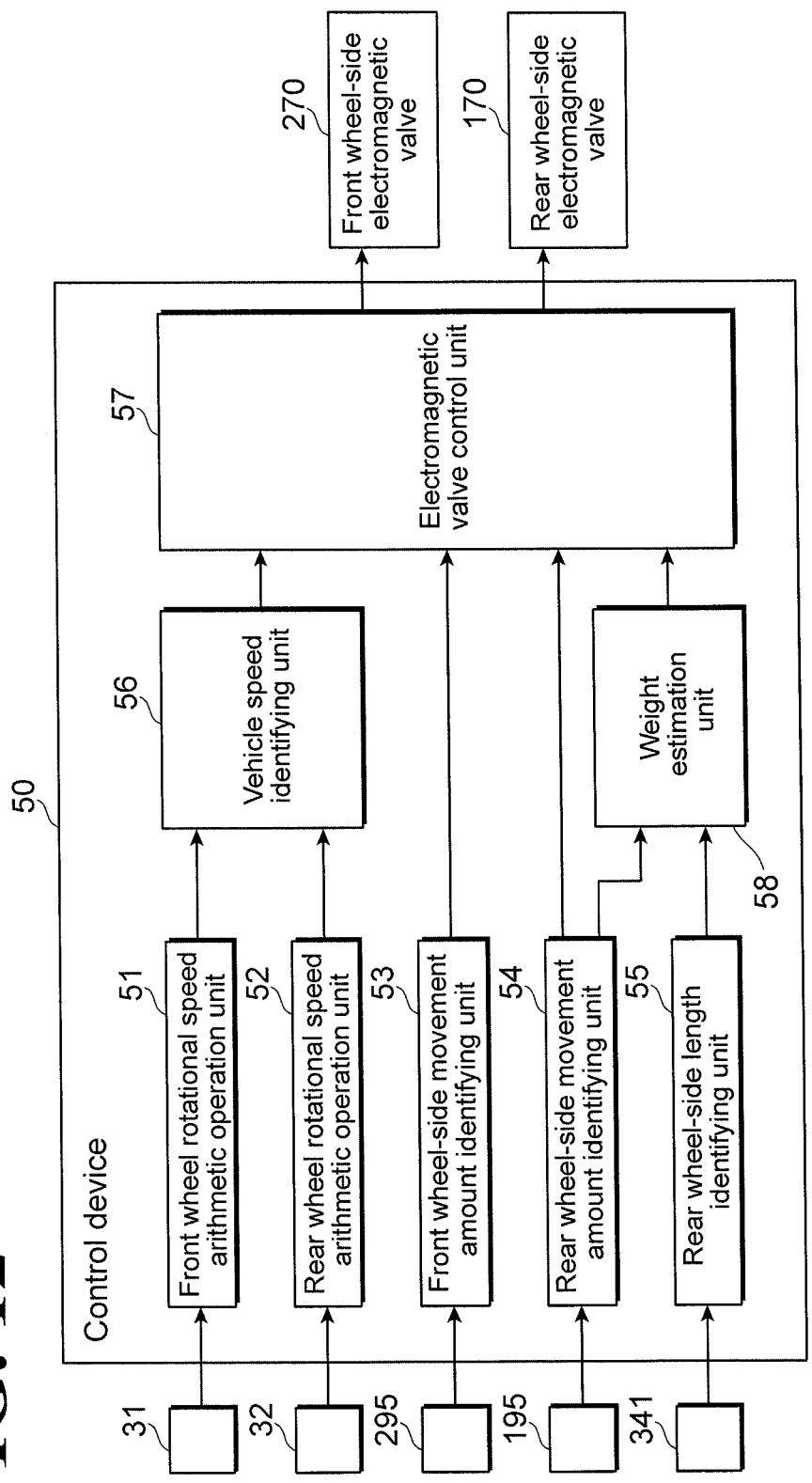
FIG. 12 is a block diagram of a control device.

The rear suspension 22 includes a rear wheel-side relative position detection unit 195 (see FIG. 12). An example of the rear wheel-side relative position detection unit 195 can be one that detects a movement amount of the support member 141 in the centerline direction relative to the hydraulic jack 143, that is, a movement amount of the support member 141 in the centerline direction relative to the body-side attaching member 184. Specifically, an example can be one in which the support member 141 is wound with a coil around its outer surface, and the hydraulic jack 143 is made up of a magnetic body so as to detect a movement amount of the support member 141 based on an impedance of the coil, which changes as the support member 141 moves in the centerline direction relative to the hydraulic jack 143.

Figure 6:
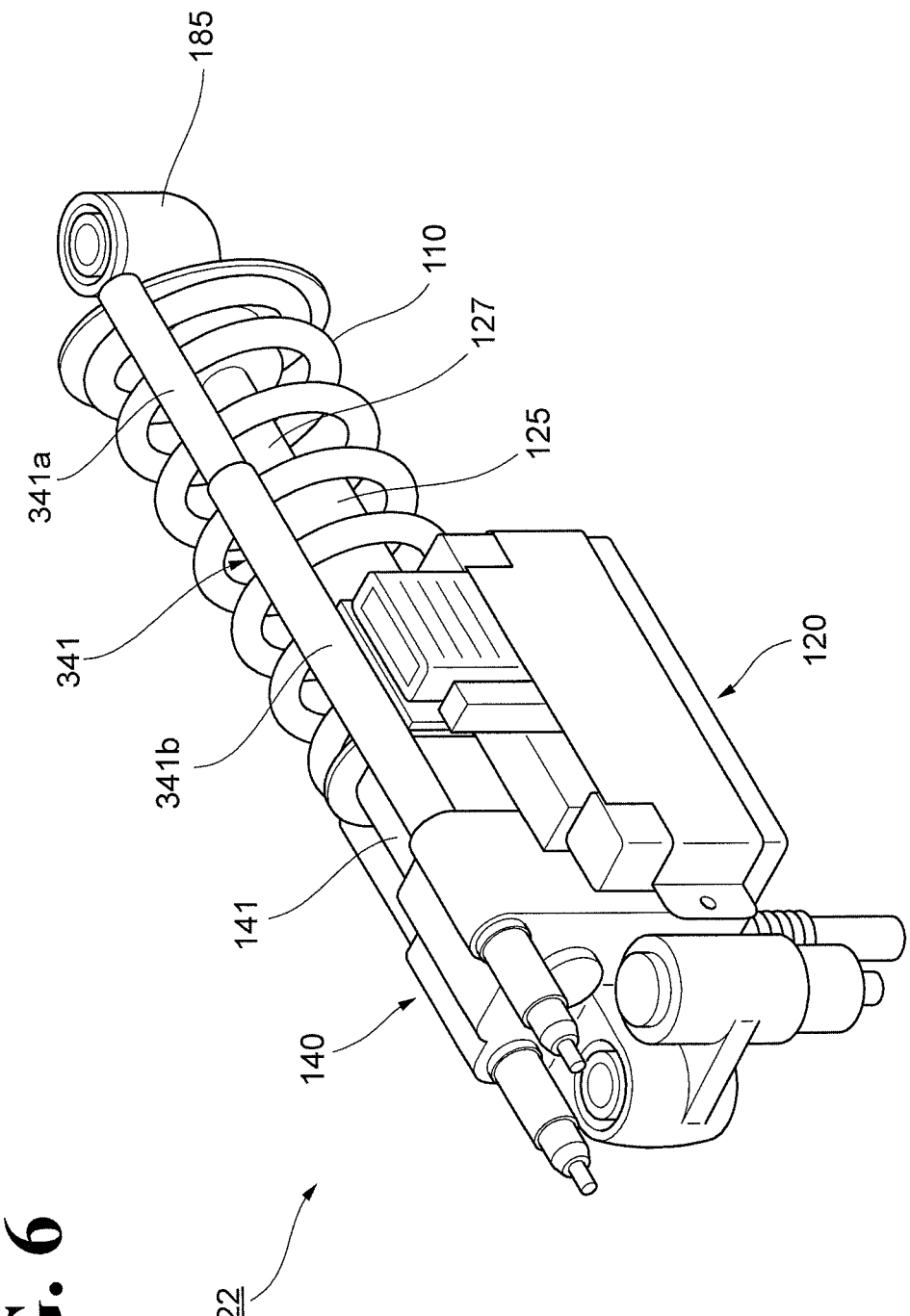
FIG. 6 is a view of an example of a suspension stroke sensor used as a rear wheel-side length variation amount detection unit.

The rear suspension 22 includes a rear wheel-side length variation amount detection unit 341 (see FIGS. 6 and 12). The rear wheel-side length variation amount detection unit 341 detects an amount of variation in total length of the rear suspension 22 (or, spring length of the rear wheel-side suspension spring 110) when the piston rod 127 moves back and forth relative to the cylinder 125 and the pipe 161. An example of the rear wheel-side length variation amount detection unit 341 can be one that detects a movement amount of the piston rod 127 (piston 126) (i.e., stretch amount of the rear wheel-side suspension spring 110) relative to the cylinder 125. Specifically, the example can be what is conventionally called a suspension stroke sensor. When the motorcycle 1 is loaded, the rear wheel-side suspension spring 110 of the rear suspension 22 is compressed, and a total length of the rear suspension 22 shortens. As the rear suspension 22 shortens, the vehicle height of the motorcycle 1 decreases. In other words, the length of the rear suspension 22 and the vehicle height of the motorcycle 1 are directly linked. In here, a result of detection of the rear wheel-side length variation amount detection unit 341 is averaged in an enough time that is longer than a natural frequency of the rear wheel-side suspension spring 110 (low-pass filter) to remove effects of fine stretching vibration of the rear suspension 22, which is caused due to rough ground surfaces, for example.

FIG. 6 is a view of an example of a suspension stroke sensor used as the rear wheel-side length variation amount detection unit 341.

The rear wheel-side length variation amount detection unit 341 shown in FIG. 6 is configured to include two pipes 341a and 341b. The pipe 341a is slidably inserted into the pipe 341b. An end of the pipe 341a, which is not inserted into the pipe 341b, is coupled to the axle-side attaching member 185 of the rear suspension 22. An end of the pipe 341b, which is not inserted with the pipe 341a, is coupled to the rear wheel-side damper 120 of the rear suspension 22. Therefore, the rear wheel-side length variation amount detection unit 341 extends and contracts when the pipe 341a moves back and forth relative to the pipe 341b as the rear suspension 22 extends and contracts (as the piston rod 127 (piston 126) moves back and forth relative to the cylinder 125).

The rear wheel-side length variation amount detection unit 341 detects a movement amount of the pipe 341a when the pipe 341a moves back and forth relative to the pipe 341b. Specifically, an example can be one in which the pipe 341a is wound with a coil around its outer surface, and the pipe 341b is made up of a magnetic body so as to detect a movement amount of the pipe 341a based on an impedance of the coil, which changes as the pipe 341a moves relative to the pipe 341b. The rear wheel-side length variation amount detection unit 341 configured as described with reference to FIG. 6 is merely an example. This, however, should not be construed in a limiting sense. The sensor has been disposed in parallel to the rear suspension 22, as shown in FIG. 6, but the sensor may not be disposed in parallel. Various conventional suspension stroke sensors may be used in a configuration for directly detecting a movement amount of the piston rod 127 relative to the cylinder 125 of the rear suspension 22. As the rear wheel-side length variation amount detection unit 341, any configuration may be applied, which is capable of detecting a movement amount of the piston rod 127 relative to the cylinder 125, but differs from a conventional suspension stroke sensor.

Next, the front forks 21 will now be described herein in detail.

Figure 7:
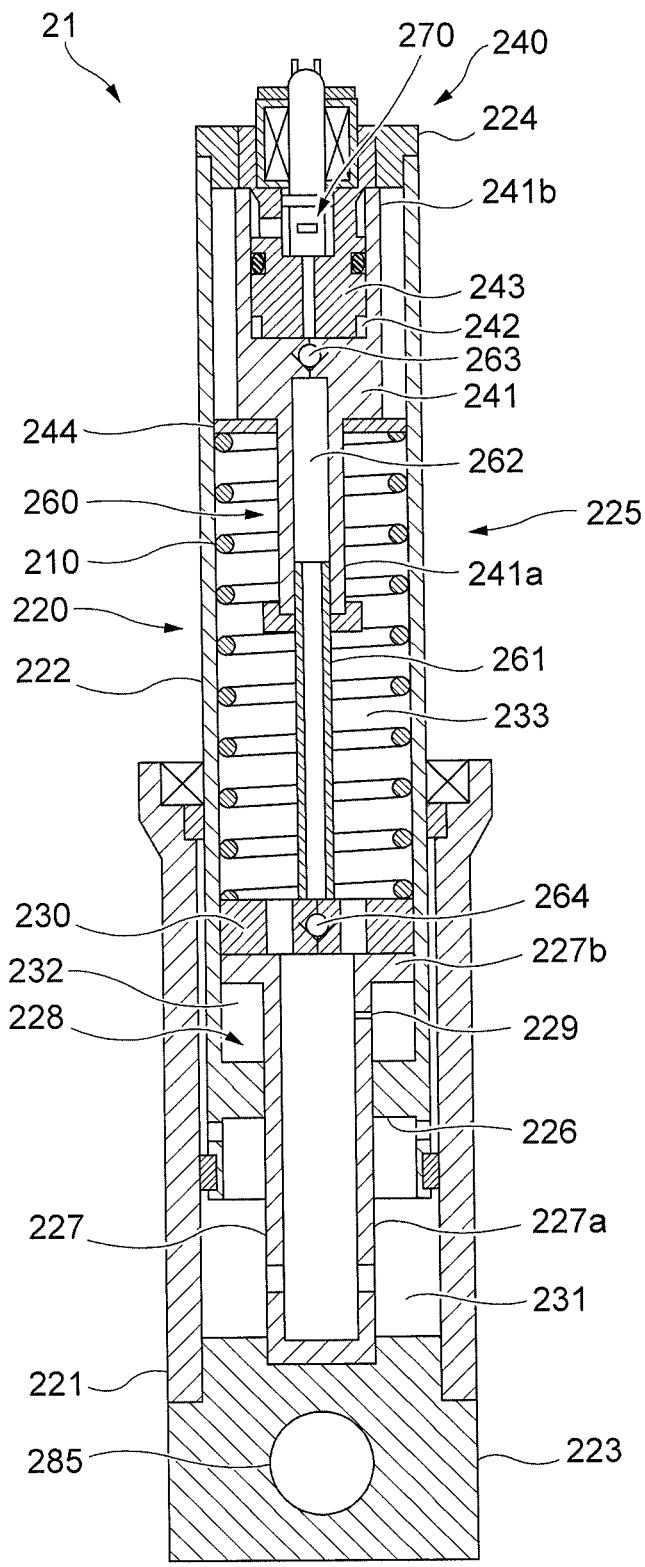
FIG. 7 is a cross-sectional view of a front fork.

FIG. 7 is a cross-sectional view of one of the front forks 21.

The front forks 21 are attached between the body 10 and the front wheel 2. Each of the front forks 21 includes a front wheel-side suspension spring 210 and a front wheel-side damper 220. The front wheel-side suspension spring 210 is an example of a front wheel-side spring, supports the vehicle weight of the motorcycle 1, and absorbs shock. The front wheel-side damper 220 attenuates vibration of the front wheel-side suspension spring 210. Each of the front forks 21 includes a front wheel-side relative position alteration device 240 and a front wheel-side fluid supply device 260. The front wheel-side relative position alteration device 240 is capable of altering a front wheel-side relative position representing a relative position between the body 10 and the front wheel 2 by adjusting a spring force of the front wheel-side suspension spring 210. The front wheel-side fluid supply device 260 is configured to supply fluid to the front wheel-side relative position alteration device 240. Each of the front forks 21 includes an axle-side attaching portion 285 and a fork pipe-side attaching portion (not shown). The axle-side attaching portion 285 is used to attach each of the front forks 21 to the front wheel 2. The fork pipe-side attaching portion (not shown) is used to attach each of the front forks 21 to a fork pipe.

The front wheel-side damper 220 includes a cylinder 225, as shown in FIG. 7. The cylinder 225 includes an outer cylinder 221, an inner cylinder 222, a bottom cover 223, and a top cover 224. The outer cylinder 221 has a thin, cylindrical shape. The inner cylinder 222 has a thin, cylindrical shape, and has one end (lower portion in FIG. 7) inserted into another one end (upper portion in FIG. 7), in the centerline direction (upper-lower direction in FIG. 7), of the outer cylinder 221 having the cylindrical shape. The bottom cover 223 covers one end (lower portion in FIG. 7), in the centerline direction, of the outer cylinder 221. The top cover 224 covers another one end (upper portion in FIG. 7), in the centerline direction, of the inner cylinder 222. The inner cylinder 222 is slidably inserted into the outer cylinder 221.

The front wheel-side damper 220 includes a piston rod 227. The piston rod 227 is attached to the bottom cover 223 so as to extend in the centerline direction. The piston rod 227 includes a cylindrical portion 227a and a flange portion 227b. The cylindrical portion 227a has a cylindrical shape extending in the centerline direction. The flange portion 227b has a disc shape disposed on another one end (upper portion in FIG. 7), in the centerline direction, of the cylindrical portion 227a.

The front wheel-side damper 220 includes a piston 226. The piston 226 is secured to one end side (lower portion side in FIG. 7), in the centerline direction, of the inner cylinder 222, and is slidable relative to an outer circumference of the cylindrical portion 227a of the piston rod 227. The piston 226 is in contact with an outer surface of the cylindrical portion 227a of the piston rod 227, and separates a space in the cylinder 225, in which fluid (oil in this embodiment) is filled, into a first oil chamber 231 and a second oil chamber 232. The first oil chamber 231 faces one end, in the centerline direction, of the piston 226. The second oil chamber 232 faces another one end, in the centerline direction, of the piston 226. In this embodiment, oil functions as an example of operating oil.

The front wheel-side damper 220 includes a cover member 230. The cover member 230 is disposed above the piston rod 227 to cover an opening of the cylindrical portion 227a of the piston rod 227. The cover member 230 supports one end (lower end in FIG. 7), in the centerline direction, of the front wheel-side suspension spring 210. The front wheel-side damper 220 includes an oil storage chamber 233. The oil storage chamber 233 is defined in a space between another one end side, in the centerline direction, of the inner cylinder 222 and the cover member 230, and in a space in the cylindrical portion 227a of the piston rod 227. The oil storage chamber 233 always communicates with the first oil chamber 231 and the second oil chamber 232.

The front wheel-side damper 220 includes a first damping force generation portion 228 and a second damping force generation portion 229. The first damping force generation portion 228 is disposed in the piston 226. The second damping force generation portion 229 is defined on the piston rod 227. The first damping force generation portion 228 and the second damping force generation portion 229 attenuate stretching vibration that occurs between the inner cylinder 222 and the piston rod 227 when the front wheel-side suspension spring 210 absorbs an impact force applied from a ground surface. The first damping force generation portion 228 is disposed so as to function as a connection passage between the first oil chamber 231 and the second oil chamber 232. The second damping force generation portion 229 is defined so as to function as a connection passage among the first oil chamber 231, the second oil chamber 232, and the oil storage chamber 233.

The front wheel-side fluid supply device 260 is a device that pumps along with stretching vibration of the piston rod 227 relative to the inner cylinder 222 to supply fluid into a jack chamber 242, described later, of the front wheel-side relative position alteration device 240.

The front wheel-side fluid supply device 260 includes a pipe 261. The pipe 261 has a cylindrical shape, and is secured to the cover member 230 of the front wheel-side damper 220 so as to extend in the centerline direction. The pipe 261 is coaxially inserted into a pump chamber 262, that is, into inside of a lower-side cylindrical portion 241a of a support member 241 of the front wheel-side relative position alteration device 240.

The front wheel-side fluid supply device 260 includes a discharge check valve 263 and an intake check valve 264. The discharge check valve 263 allows fluid in the pump chamber 262 compressed when the piston rod 227 enters into the inner cylinder 222 to discharge toward the jack chamber 242, described later. The intake check valve 264 allows fluid in the oil storage chamber 233 to enter into the pump chamber 262 decompressed when the piston rod 227 withdraws from the inner cylinder 222.

FIGS. 8A and 8B illustrate how the front wheel-side fluid supply device 260 operates.

The front wheel-side fluid supply device 260 with the configuration described hereinbefore pumps when each of the front forks 21 receives forces from a ground surface due to its roughness as the motorcycle 1 travels, the piston rod 227 enters into and withdraws from the inner cylinder 222, and the pipe 261 enters into and withdraws from the support member 241 of the front wheel-side relative position alteration device 240. During this pumping movement, when the pump chamber 262 is compressed, fluid in the pump chamber 262 opens the discharge check valve 263 to discharge toward the jack chamber 242 of the front wheel-side relative position alteration device 240 (see FIG. 8A). When the pump chamber 262 is decompressed, fluid in the oil storage chamber 233 opens the intake check valve 264 to enter into the pump chamber 262 (see FIG. 8B).

The front wheel-side relative position alteration device 240 includes the support member 241. The support member 241 is an example of a front wheel-side support member, is disposed in the inner cylinder 222 of the front wheel-side damper 220, and supports, via a spring receiver 244 having a disc shape, another one end (upper portion in FIGS. 8A and 8B), in the centerline direction, of the front wheel-side suspension spring 210. The support member 241 has the lower-side cylindrical portion 241a and an upper-side cylindrical portion 241b. The lower-side cylindrical portion 241a is defined in a cylindrical shape at one end side (lower portion side in FIGS. 8A and 8B) in the centerline direction. The upper-side cylindrical portion 241b is defined in a cylindrical shape at another one end side (upper portion side in FIGS. 8A and 8B) in the centerline direction. The lower-side cylindrical portion 241a is inserted with the pipe 261.

The front wheel-side relative position alteration device 240 includes a hydraulic jack 243. The hydraulic jack 243 is fitted into the upper-side cylindrical portion 241b of the support member 241 to define the jack chamber 242 together with the support member 241. The support member 241 moves in the centerline direction relative to the hydraulic jack 243, as fluid in the cylinder 225 enters into the jack chamber 242, and as the fluid discharges from the jack chamber 242. The hydraulic jack 243 is attached, on its upper portion, with the fork pipe-side attaching portion (not shown). As the support member 241 moves in the centerline direction relative to the hydraulic jack 243, a spring force of the front wheel-side suspension spring 210 changes. As a result, a relative position of the seat 19 changes with respect to the front wheel 2.

The front wheel-side relative position alteration device 240 includes a front wheel-side electromagnetic valve 270. The front wheel-side electromagnetic valve 270 is an electromagnetic valve (solenoid valve). The front wheel-side electromagnetic valve 270 is disposed on a fluid flow passage between the jack chamber 242 and the oil storage chamber 233. The front wheel-side electromagnetic valve 270 closes so as to fill fluid supplied to the jack chamber 242 in the jack chamber 242. The front wheel-side electromagnetic valve 270 opens so as to discharge the fluid supplied to the jack chamber 242 into the oil storage chamber 233. The front wheel-side electromagnetic valve 270 will be described later in detail.

Figure 9A:
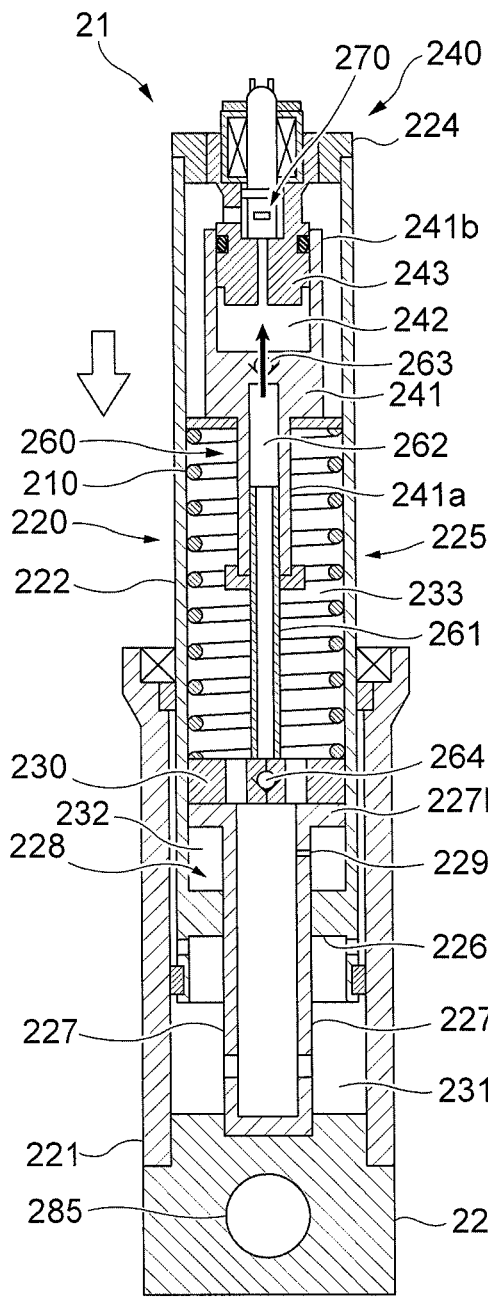
FIGS. 9A and 9B illustrate how a front wheel-side relative position alteration device adjusts the vehicle height.
Figure 9B:
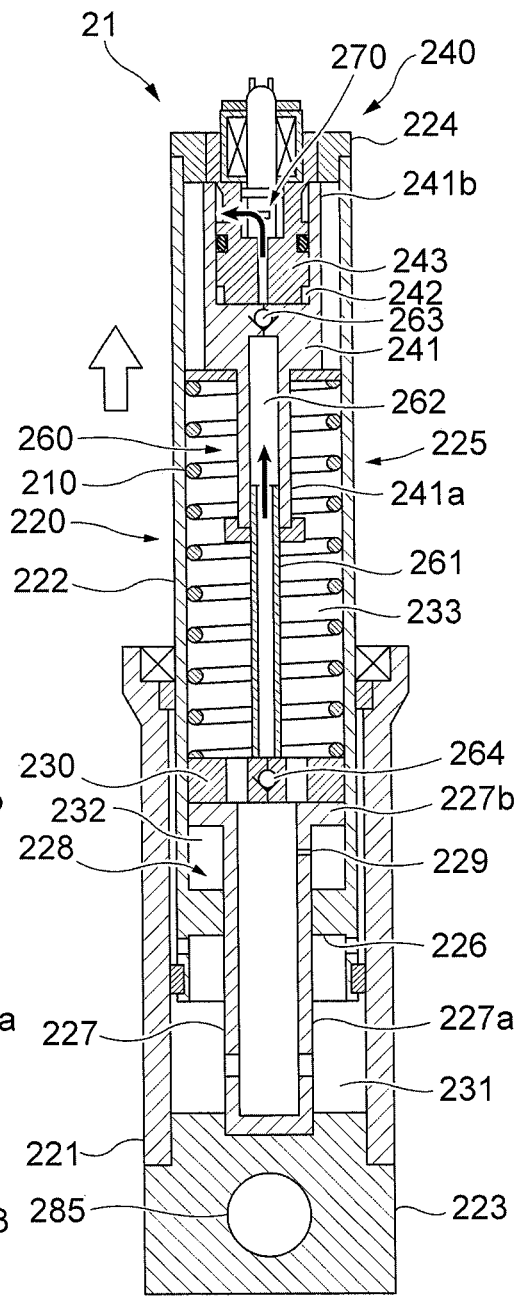

FIGS. 9A and 9B illustrate how the front wheel-side relative position alteration device 240 adjusts the vehicle height.

Upon the front wheel-side electromagnetic valve 270 being fully open starts closing, even if only slightly, the front wheel-side fluid supply device 260 supplies fluid into the jack chamber 242. The fluid is thus filled inside the jack chamber 242. The support member 241 accordingly moves toward one end side (lower side in FIG. 9A) in the centerline direction relative to the hydraulic jack 243 to shorten the front wheel-side suspension spring 210 in length (see FIG. 9A). Meanwhile, upon the front wheel-side electromagnetic valve 270 fully opens, fluid in the jack chamber 242 discharges into the oil storage chamber 233. The support member 241 accordingly moves toward another one end side (upper side in FIG. 9B) in the centerline direction relative to the hydraulic jack 243 to extend the front wheel-side suspension spring 210 in length (see FIG. 9B).

When the support member 241 moves relative to the hydraulic jack 243 to shorten the front wheel-side suspension spring 210 in length, the front wheel-side suspension spring 210 applies to the support member 241 a spring force greater than a spring force applied before the support member 241 moves relative to the hydraulic jack 243. As a result, an initial load changes, under which a relative position between the body 10 and the front wheel 2 does not change, even when the body 10 applies a force toward the front wheel 2. In such a case, even when an identical force is applied from the body 10 (seat 19) toward the one end side (lower side in FIGS. 9A and 9B) in the centerline direction, an amount of depression of each of the front forks 21 (change in distance between the fork pipe-side attaching portion (not shown) and the axle-side attaching portion 285) decreases. Accordingly, when the support member 241 moves relative to the hydraulic jack 243 to shorten the front wheel-side suspension spring 210 in length, a height of the seat 19 becomes higher (vehicle height increases) than a height before the support member 241 moves relative to the hydraulic jack 243. That is, as the front wheel-side electromagnetic valve 270 decreases its opening degree, the vehicle height increases.

Meanwhile, when the support member 241 moves relative to the hydraulic jack 243 to extend the front wheel-side suspension spring 210 in length, the front wheel-side suspension spring 210 applies to the support member 241 a spring force smaller than a spring force applied before the support member 241 moves relative to the hydraulic jack 243. In such a case, even when an identical force is applied from the body 10 (seat 19) toward the one end side (lower side in FIGS. 9A and 9B) in the centerline direction, an amount of depression of each of the front forks 21 (change in distance between the fork pipe-side attaching portion (not shown) and the axle-side attaching portion 285) increases. Accordingly, when the support member 241 moves relative to the hydraulic jack 243 to extend the front wheel-side suspension spring 210 in length, a height of the seat 19 becomes lower (vehicle height decreases) than a height before the support member 241 moves relative to the hydraulic jack 243. That is, as the front wheel-side electromagnetic valve 270 increases its opening degree, the vehicle height decreases.

The front wheel-side electromagnetic valve 270 is controlled by the control device 50 for its opening and closing or its opening degree.

Fluid supplied to the jack chamber 242 when the front wheel-side electromagnetic valve 270 opens may discharge toward the first oil chamber 231 and/or the second oil chamber 232.

Figure 10:
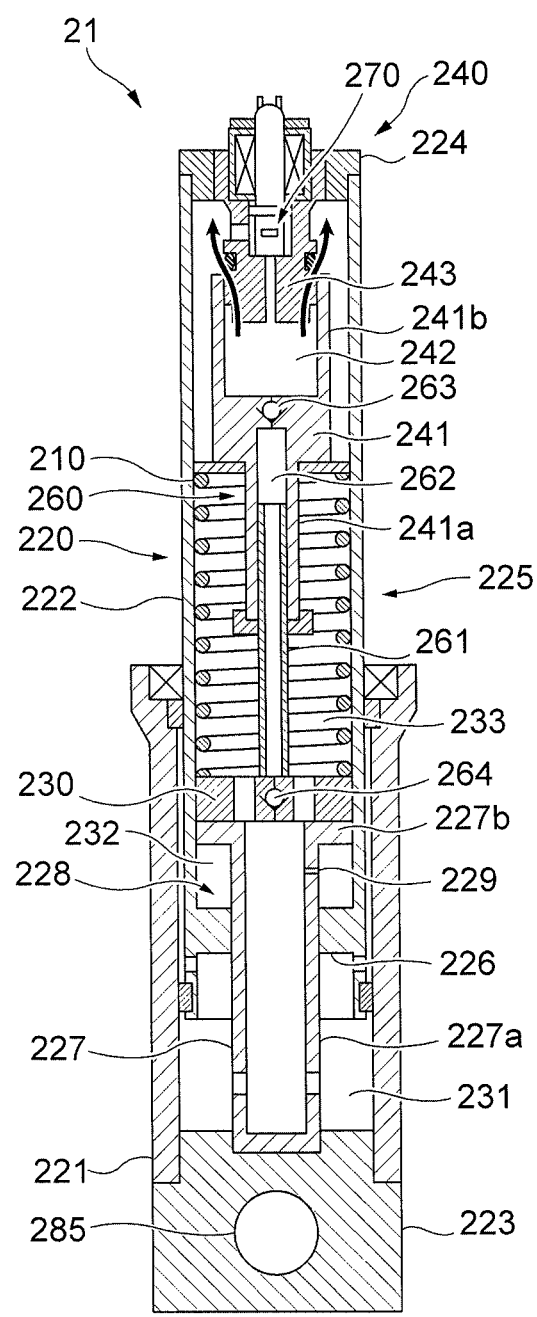
FIG. 10 is a view of a mechanism of how the vehicle height is maintained.

FIG. 10 is a view of a mechanism of how the vehicle height is maintained.

As shown in FIG. 10, the hydraulic jack 243 has an outer surface defined with a return passage (not shown). Through the return passage, fluid in the jack chamber 242 returns into the oil storage chamber 233 when the support member 241 moves to a predetermined limit position toward the one end side (lower side in FIGS. 9A and 9B) in the centerline direction relative to the hydraulic jack 243.

Even when fluid is kept supplied into the jack chamber 242 while the front wheel-side electromagnetic valve 270 is fully closed, the return passage allows the supplied fluid to return into the oil storage chamber 233, and thus a position of the support member 241 with respect to the hydraulic jack 243, that is, a height of the seat 19 (vehicle height), is maintained.

A state of each of the front forks 21 when the front wheel-side electromagnetic valve 270 is fully open, and a movement amount of the support member 241 relative to the hydraulic jack 243 is minimum (zero) will hereinafter be referred to as a minimum state, and a state of each of the front forks 21 when the front wheel-side electromagnetic valve 270 is fully closed, and a movement amount of the support member 241 relative to the hydraulic jack 243 is maximum will hereinafter be referred to as a maximum state.

Each of the front forks 21 includes a front wheel-side relative position detection unit 295 (see FIG. 12). An example of the front wheel-side relative position detection unit 295 can be one that detects a movement amount of the support member 241 in the centerline direction relative to the hydraulic jack 243, that is, a movement amount of the support member 241 in the centerline direction relative to the fork pipe-side attaching portion. Specifically, an example can be one in which the inner cylinder 222 is wound with a coil at a position in a radial direction, that is, around its outer surface, and at a position in the centerline direction, that is, a position corresponding to the support member 241, and the support member 241 is made up of a magnetic body so as to detect a movement amount of the support member 241 based on an impedance of the coil, which changes as the support member 241 moves in the centerline direction relative to the hydraulic jack 243.

Next, configurations of the front wheel-side electromagnetic valve 270 of the front wheel-side relative position alteration device 240 and the rear wheel-side electromagnetic valve 170 of the rear wheel-side relative position alteration device 140 will now be described herein.

FIG. 11A illustrates a schematic configuration of the front wheel-side electromagnetic valve 270, and FIG. 11B illustrates a schematic configuration of the rear wheel-side electromagnetic valve 170.

The front wheel-side electromagnetic valve 270 is what is called a normally-open electromagnetic valve, and includes, as shown in FIG. 11A, a bobbin 272, a stationary iron core 273, a holder 274, and a movable iron core 275. The bobbin 272 is wrapped around with a coil 271. The stationary iron core 273 has a rod shape, and is secured to a hollow portion 272a of the bobbin 272. The holder 274 supports the coil 271, the bobbin 272, and the stationary iron core 273. The movable iron core 275 has an approximately disc shape, is disposed in line with a tip (end surface) of the stationary iron core 273, and will be attracted by the stationary iron core 273. The front wheel-side electromagnetic valve 270 includes a valve body 276, a body 277, a valve chamber 278, a cover member 279, and a coil spring 280. The valve body 276 is secured at a tip center of the movable iron core 275. The body 277 is combined to the holder 274. The valve chamber 278 is defined on the body 277, and is disposed with the valve body 276. The cover member 279 covers an opening portion defined on the body 277, and defines the valve chamber 278 together with the body 277. The coil spring 280 is disposed between the valve body 276 and the cover member 279. The front wheel-side electromagnetic valve 270 includes a valve seat 281, an inflow passage 282 and an outflow passage 283. The valve seat 281 is defined in the body 277, and is disposed in the valve chamber 278 in line with the valve body 276. The inflow passage 282 is defined in the body 277, and is configured to allow fluid to flow from the jack chamber 242 (see FIG. 10) to the valve chamber 278. The outflow passage 283 is defined in the body 277, and is configured to allow fluid to discharge from the valve chamber 278, via the valve seat 281, to the oil storage chamber 233. The front wheel-side electromagnetic valve 270 may be a normally-closed electromagnetic valve.

The rear wheel-side electromagnetic valve 170 is what is called a normally-open electromagnetic valve, and includes, as shown in FIG. 11B, a bobbin 172, a stationary iron core 173, a holder 174, and a movable iron core 175. The bobbin 172 is wrapped around with a coil 171. The stationary iron core 173 has a rod shape, and is secured to a hollow portion 172a of the bobbin 172. The holder 174 supports the coil 171, the bobbin 172, and the stationary iron core 173. The movable iron core 175 has an approximately disc shape, is disposed in line with a tip (end surface) of the stationary iron core 173, and will be attracted by the stationary iron core 173. The rear wheel-side electromagnetic valve 170 includes a valve body 176, a body 177, a valve chamber 178, a cover member 179, and a coil spring 180. The valve body 176 is secured at a tip center of the movable iron core 175. The body 177 is combined to the holder 174. The valve chamber 178 is defined on the body 177, and is disposed with the valve body 176. The cover member 179 covers an opening portion defined on the body 177, and defines the valve chamber 178 together with the body 177. The coil spring 180 is disposed between the valve body 176 and the cover member 179. The rear wheel-side electromagnetic valve 170 includes a valve seat 181, an inflow passage 182, and an outflow passage 183. The valve seat 181 is defined in the body 177, and is disposed in the valve chamber 178 in line with the valve body 176. The inflow passage 182 is defined in the body 177, and is configured to allow fluid to flow from the jack chamber 142 (see FIG. 5) to the valve chamber 178. The outflow passage 183 is defined in the body 177, and is configured to allow fluid to discharge from the valve chamber 178, via the valve seat 181, to the fluid storage chamber 143a. The rear wheel-side electromagnetic valve 170 may be a normally-closed electromagnetic valve.

When the front wheel-side electromagnetic valve 270 and the rear wheel-side electromagnetic valve 170 with the configurations described hereinbefore are not powered, that is, when the coils 271 and 171 are not powered, the coil springs 280 and 180 urge the movable iron cores 275 and 175 downward in the figures, and thus the valve bodies 276 and 176 respectively secured to the tips (end surfaces) of the movable iron cores 275 and 175 do not respectively abut the valve seats 281 and 181. Therefore, the front wheel-side electromagnetic valve 270 and the rear wheel-side electromagnetic valve 170 are open since the inflow passages 282 and 182 and the outflow passages 283 and 183 respectively communicate with each other. On the other hand, when the front wheel-side electromagnetic valve 270 and the rear wheel-side electromagnetic valve 170 are powered, that is, when the coils 271 and 171 are powered, and thus the coils 271 and 171 are respectively in an excitation state, the movable iron cores 275 and 175 are displaced in accordance with respective balances between attraction forces of the stationary iron cores 273 and 173 and urging forces of the coil springs 280 and 180. The front wheel-side electromagnetic valve 270 and the rear wheel-side electromagnetic valve 170 are adjusted for their respective positions of the valve bodies 276 and 176 with respect to the valve seats 281 and 181, that is, for their valve opening degrees. The valve opening degrees can be adjusted by changing electric power (current and voltage) to be supplied to the coils 271 and 171.

Next, the control device 50 will now be described herein.

FIG. 12 is a block diagram of the control device 50.

The control device 50 includes a central processing unit (CPU), a read-only memory (ROM), a random-access memory (RAM), and an electrically erasable programmable read-only memory (EEPROM). The ROM is configured to store programs to be executed by the CPU and various data. The RAM is to be used as a work memory for the CPU. The EEPROM is a nonvolatile memory. The control device 50 accepts signals output from the front wheel rotation detection sensor 31, the rear wheel rotation detection sensor 32, the front wheel-side relative position detection unit 295, the rear wheel-side relative position detection unit 195, and the rear wheel-side length variation amount detection unit 341, described above, for example.

The control device 50 includes a front wheel rotational speed arithmetic operation unit 51 and a rear wheel rotational speed arithmetic operation unit 52. The front wheel rotational speed arithmetic operation unit 51 performs an arithmetic operation to obtain a rotational speed of the front wheel 2 based on a signal output from the front wheel rotation detection sensor 31. The rear wheel rotational speed arithmetic operation unit 52 performs an arithmetic operation to obtain a rotational speed of the rear wheel 3 based on a signal output from the rear wheel rotation detection sensor 32. The front wheel rotational speed arithmetic operation unit 51 and the rear wheel rotational speed arithmetic operation unit 52 respectively identify rotation angles based on pulse signals that are signals output from the sensors, and performs differentiation with elapsed times to perform arithmetic operations to obtain rotational speeds.

The control device 50 includes a front wheel-side movement amount identifying unit 53. The front wheel-side movement amount identifying unit 53 is configured to identify a front wheel-side movement amount Lf representing a movement amount of the support member 241 of the front wheel-side relative position alteration device 240 (see FIGS. 9A and 9B) relative to the hydraulic jack 243 based on a signal output from the front wheel-side relative position detection unit 295. The control device 50 includes a rear wheel-side movement amount identifying unit 54. The rear wheel-side movement amount identifying unit 54 is configured to identify a rear wheel-side movement amount Lr representing a movement amount of the support member 141 of the rear wheel-side relative position alteration device 140 relative to the hydraulic jack 143 based on a signal output from the rear wheel-side relative position detection unit 195. The front wheel-side movement amount identifying unit 53 and the rear wheel-side movement amount identifying unit 54 can respectively identify, for example, the front wheel-side movement amount Lf and the rear wheel-side movement amount Lr based on each of interrelations, which are stored in the ROM beforehand, between an impedance of the coil and the front wheel-side movement amount Lf or the rear wheel-side movement amount Lr.

The control device 50 includes a rear wheel-side length identifying unit 55. The rear wheel-side length identifying unit 55 is configured to identify a total length of the rear suspension 22 (rear wheel-side length) based on a signal output from the rear wheel-side length variation amount detection unit 341. The rear wheel-side length identifying unit 55 can identify, for example, a rear wheel-side length based on an interrelation, which is stored in the ROM beforehand, between an impedance of the coil and a rear wheel-side length.

The control device 50 includes a vehicle speed identifying unit 56. The vehicle speed identifying unit 56 is configured to identify a vehicle speed Vc representing a travel speed of the motorcycle 1 based on a rotational speed of the front wheel 2, which is obtained when the front wheel rotational speed arithmetic operation unit 51 has performed an arithmetic operation, and/or a rotational speed of the rear wheel 3, which is obtained when the rear wheel rotational speed arithmetic operation unit 52 has performed an arithmetic operation. The vehicle speed identifying unit 56 identifies the vehicle speed Vc by performing, using a front wheel rotational speed Rf or a rear wheel rotational speed Rr, an arithmetic operation to obtain a travel speed of the front wheel 2 or the rear wheel 3. A travel speed of the front wheel 2 can be obtained by performing an arithmetic operation using the front wheel rotational speed Rf and an outer diameter of a tire attached to the front wheel 2. A travel speed of the rear wheel 3 can be obtained by performing an arithmetic operation using the rear wheel rotational speed Rr and an outer diameter of a tire attached to the rear wheel 3. When the motorcycle 1 is traveling in a normal state, the vehicle speed Vc can be regarded as identical to a travel speed of the front wheel 2 and/or a travel speed of the rear wheel 3. The vehicle speed identifying unit 56 may identify the vehicle speed Vc by performing an arithmetic operation to obtain an average travel speed between a travel speed of the front wheel 2 and a travel speed of the rear wheel 3 using an average value between the front wheel rotational speed Rf and the rear wheel rotational speed Rr.

The control device 50 includes a weight estimation unit 58 configured to estimate a weight applied to the motorcycle 1 that is an example of a vehicle. The weight estimation unit 58 will be described later in detail.

The control device 50 includes an electromagnetic valve control unit 57. The electromagnetic valve control unit 57 is configured to control the front wheel-side electromagnetic valve 270, for its opening degree, of the front wheel-side relative position alteration device 240 and the rear wheel-side electromagnetic valve 170, for its opening degree, of the rear wheel-side relative position alteration device 140, based on the vehicle speed Vc identified by the vehicle speed identifying unit 56. The electromagnetic valve control unit 57 will be described later in detail.

Allowing the CPU to execute software stored in a storage area such as the ROM can achieve the front wheel rotational speed arithmetic operation unit 51, the rear wheel rotational speed arithmetic operation unit 52, the front wheel-side movement amount identifying unit 53, the rear wheel-side movement amount identifying unit 54, the rear wheel-side length identifying unit 55, the vehicle speed identifying unit 56, and the electromagnetic valve control unit 57.

Next, the electromagnetic valve control unit 57 of the control device 50 will now be described herein in detail.

Figure 13:
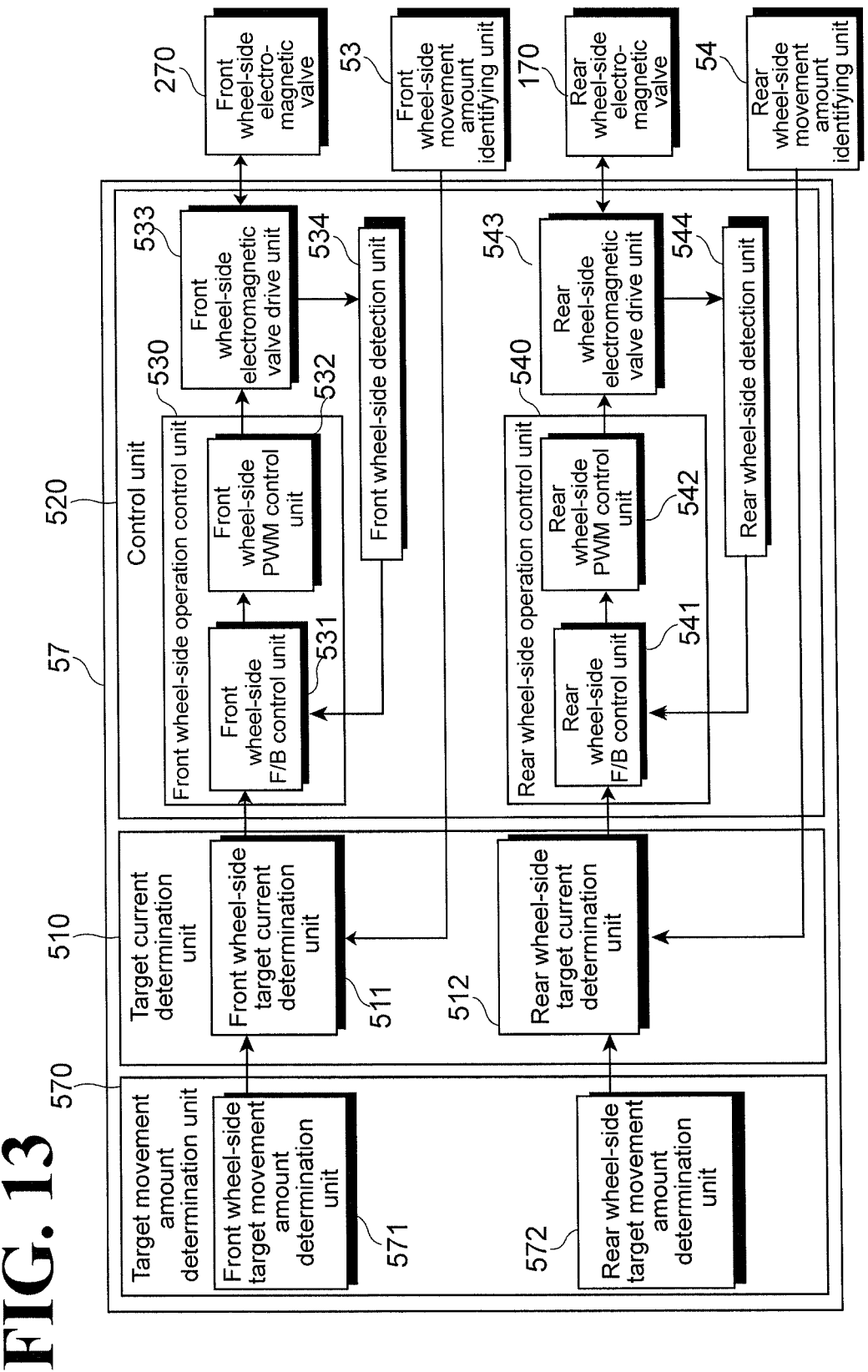
FIG. 13 is a block diagram of an electromagnetic valve control unit.

FIG. 13 is a block diagram of the electromagnetic valve control unit 57 according to this embodiment.

The electromagnetic valve control unit 57 includes a target movement amount determination unit 570. The target movement amount determination unit 570 includes a front wheel-side target movement amount determination unit 571, a rear wheel-side target movement amount determination unit 572, and a weight estimation unit 58. The front wheel-side target movement amount determination unit 571 determines a front wheel-side target movement amount representing a target movement amount (movement amount target value) for the front wheel-side movement amount Lf. The rear wheel-side target movement amount determination unit 572 determines a rear wheel-side target movement amount representing a target movement amount for the rear wheel-side movement amount Lr. The weight estimation unit 58 is configured to estimate a weight applied to the motorcycle 1 that is an example of a vehicle. The electromagnetic valve control unit 57 includes a target current determination unit 510 and a control unit 520. The target current determination unit 510 is configured to determine target currents to be supplied to the front wheel-side electromagnetic valve 270 of the front wheel-side relative position alteration device 240 and the rear wheel-side electromagnetic valve 170 of the rear wheel-side relative position alteration device 140. The control unit 520 is configured to perform controls including a feedback control based on the target currents determined by the target current determination unit 510. The electromagnetic valve control unit 57 functions as a front wheel-side movement amount control unit and a rear wheel-side movement amount control unit.

Figure 14A:
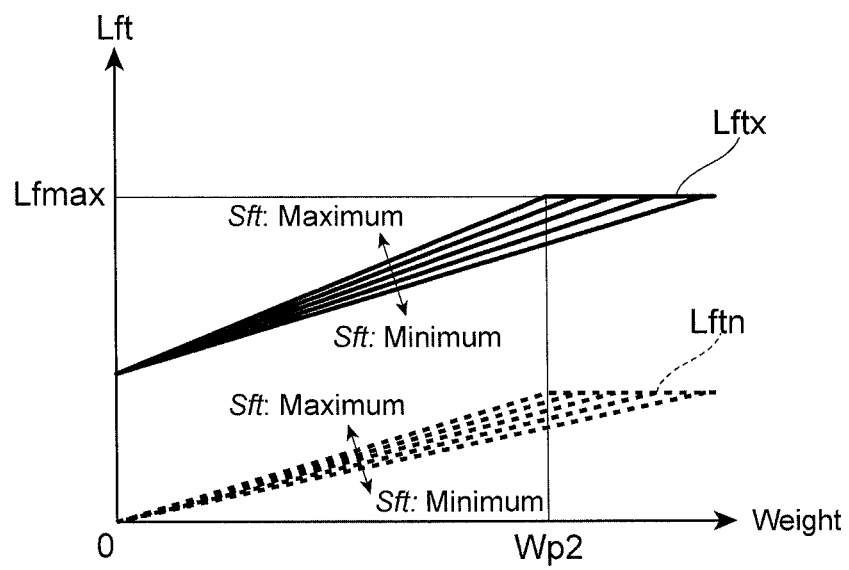
FIG. 14A is a graph illustrating an interrelation among a weight estimated by or a temporary weight set by a weight estimation unit, a front wheel-side target movement amount, and a front wheel-side target length.
Figure 14B:
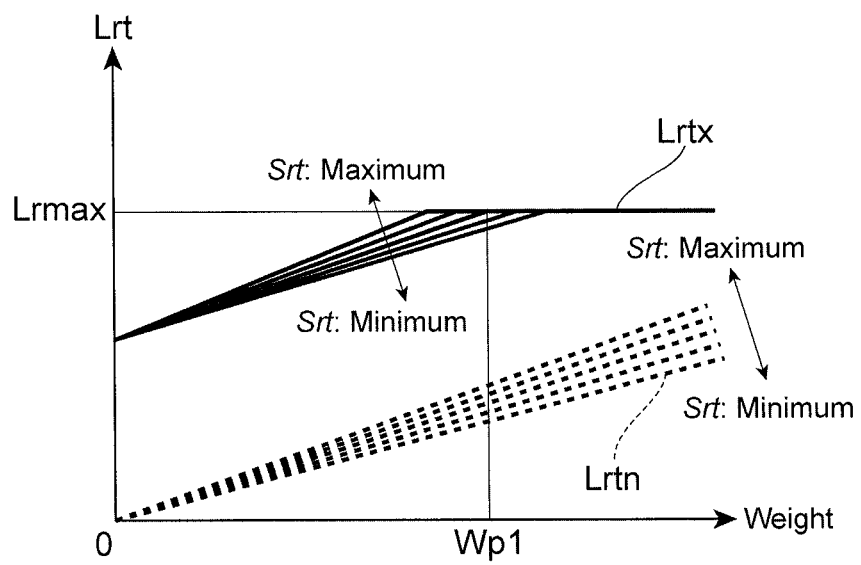
FIG. 14B is a graph illustrating an interrelation among a weight estimated by or a temporary weight set by the weight estimation unit, a rear wheel-side target movement amount, and a rear wheel-side target length.

FIG. 14A is a graph illustrating an interrelation among a weight estimated by or a temporary weight set by the weight estimation unit 58, a front wheel-side target movement amount Lft, and a front wheel-side target length Sft, described later. FIG. 14B is a graph illustrating an interrelation among a weight estimated by or a temporary weight set by the weight estimation unit 58, a rear wheel-side target movement amount Lrt, and a rear wheel-side target length Srt, described later.

FIG. 14A shows a front wheel-side maximum target movement amount Lftx representing a maximum target movement amount for the front wheel-side target movement amount Lft and a front wheel-side minimum target movement amount Lftn representing a minimum target movement amount. FIG. 14B shows a rear wheel-side maximum target movement amount Lrtx representing a maximum target movement amount for the rear wheel-side target movement amount Lrt and a rear wheel-side minimum target movement amount Lrtn representing a minimum target movement amount.

In the interrelation illustrated in FIG. 14B, when a weight is less than a predetermined weight Wp, the heavier the weight, the greater the rear wheel-side target movement amount Lrt, and when the weight is equal to or larger than the predetermined weight Wp, the rear wheel-side target movement amount Lrt reaches an upper limit value, that is, a rear wheel-side upper limit movement amount Lrmax. In the interrelation illustrated in FIG. 14A, when a weight is less than the predetermined weight Wp, the heavier the weight, the greater the front wheel-side target movement amount Lft, and when the weight is equal to or larger than the predetermined weight Wp, the heavier the weight, the smaller the front wheel-side target movement amount Lft. FIGS. 14A and 14B show the predetermined weight Wp in the interrelation graphs when the rear wheel-side target length Srt is set to "medium," described later. However, a specific value of the predetermined weight Wp increases as the rear wheel-side target length Srt shortens.

The front wheel-side target movement amount determination unit 571 of the target movement amount determination unit 570 determines the front wheel-side maximum target movement amount Lftx and the front wheel-side minimum target movement amount Lftn based on a weight estimated by or a temporary weight set by the weight estimation unit 58, as described later, a map having the interrelation illustrated in FIG. 14A, which is created beforehand based on an experimental rule, and which is stored in the ROM, and the front wheel-side target length Sft corresponding to a target height selected by a user via a vehicle height adjustment switch (not shown), described later.

The rear wheel-side target movement amount determination unit 572 of the target movement amount determination unit 570 determines the rear wheel-side maximum target movement amount Lrtx and the rear wheel-side minimum target movement amount Lrtn based on the weight estimated by or the temporary weight set by the weight estimation unit 58, a map having the interrelation illustrated in FIG. 14B, which is created beforehand based on an experimental rule, and which is stored in the ROM, and the rear wheel-side target length Srt corresponding to the height selected by the user via the vehicle height adjustment switch (not shown).

The vehicle height adjustment switch is a switch disposed so that a user is able to select a desired vehicle height. An example of the vehicle height adjustment switch is what is called a dial switch disposed adjacent to a speedometer, for example. The vehicle height adjustment switch may be configured to have a knob to be turned by the user so that a target height is selectable from among heights in five stages "minimum," "low," "medium," "high," and "maximum."

The ROM stores beforehand maps, as illustrated in FIGS. 14B and 14A. The maps correspond to the heights in five stages selectable by a user. Each of the maps shows correspondence among a weight estimated by or a temporary weight set by the weight estimation unit 58, a height selected by the user, and the front wheel-side target length Sft or the rear wheel-side target length Srt. The front wheel-side target movement amount determination unit 571 and the rear wheel-side target movement amount determination unit 572 use one of the maps each showing an interrelation where the higher the height selected by a user via the vehicle height adjustment switch, the longer the front wheel-side target length Sft and the rear wheel-side target length Srt. For example, the front wheel-side target movement amount determination unit 571 and the rear wheel-side target movement amount determination unit 572 respectively use one of the maps, in which the front wheel-side target length Sft and the rear wheel-side target length Srt are maximum when the user has selected "maximum" via the vehicle height adjustment switch, and respectively use another one of the maps, in which the front wheel-side target length Sft and the rear wheel-side target length Srt are minimum when the user has selected "minimum." The front wheel-side target movement amount determination unit 571 and the rear wheel-side target movement amount determination unit 572 respectively use one of the maps, in which the front wheel-side target length Sft and the rear wheel-side target length Srt are "long," "medium," or "short" when the user has selected "high," "medium," or "low" via the vehicle height adjustment switch.

The target movement amount determination unit 570 sets a target movement amount to a minimum-side target movement amount when the vehicle speed Vc identified by the vehicle speed identifying unit 56 after the motorcycle 1 has started traveling is smaller than a predetermined increasing vehicle speed Vu. The target movement amount determination unit 570 sets the target movement amount to a maximum-side target movement amount when the vehicle speed Vc has increased from a speed lower than the increasing vehicle speed Vu to the increasing vehicle speed Vu or larger. While the vehicle speed Vc identified by the vehicle speed identifying unit 56 is equal to or larger than the increasing vehicle speed Vu, the target movement amount determination unit 570 keeps setting the target movement amount to the maximum-side target movement amount. When the motorcycle 1 being traveled at a speed equal to or larger than the increasing vehicle speed Vu decelerates to a speed equal to or lower than a predetermined decreasing vehicle speed Vd, the target movement amount determination unit 570 sets the target movement amount to the minimum-side target movement amount. An example of the increasing vehicle speed Vu is 10 km/h, and an example of the decreasing vehicle speed Vd is 8 km/h.

For example, when the vehicle speed Vc has increased from a speed smaller than the increasing vehicle speed Vu to the increasing vehicle speed Vu or larger, the front wheel-side target movement amount determination unit 571 and the rear wheel-side target movement amount determination unit 572 set respective target movement amounts to the front wheel-side maximum target movement amount Lftx and the rear wheel-side maximum target movement amount Lrtx. Meanwhile, when the vehicle speed Vc has decreased from a speed equal to or larger than the increasing vehicle speed Vu to the decreasing vehicle speed Vd or smaller, the front wheel-side target movement amount determination unit 571 and the rear wheel-side target movement amount determination unit 572 set respective target movement amounts to the front wheel-side minimum target movement amount Lftn and the rear wheel-side minimum target movement amount Lrtn.

When the motorcycle 1 decelerates quickly due to sudden braking, for example, the target movement amount determination unit 570 sets a target movement amount to a minimum-side target movement amount, even when the vehicle speed Vc identified by the vehicle speed identifying unit 56 is larger than the decreasing vehicle speed Vd. In other words, the front wheel-side target movement amount determination unit 571 and the rear wheel-side target movement amount determination unit 572 set respective target movement amounts to the front wheel-side minimum target movement amount Lftn and the rear wheel-side minimum target movement amount Lrtn. Whether the motorcycle 1 has decelerated quickly can be determined whether an amount of reduction in the vehicle speed Vc per unit time, which is identified by the vehicle speed identifying unit 56, is equal to or less than a predetermined value.

The target current determination unit 510 includes a front wheel-side target current determination unit 511 and a rear wheel-side target current determination unit 512. The front wheel-side target current determination unit 511 determines a front wheel-side target current representing a target current for the front wheel-side electromagnetic valve 270 based on the front wheel-side target movement amount Lft determined by the front wheel-side target movement amount determination unit 571. The rear wheel-side target current determination unit 512 determines a rear wheel-side target current representing a target current for the rear wheel-side electromagnetic valve 170 based on the rear wheel-side target movement amount Lrt determined by the rear wheel-side target movement amount determination unit 572.

The front wheel-side target current determination unit 511 determines, for example, a front wheel-side target current by assigning the front wheel-side target movement amount Lft determined by the front wheel-side target movement amount determination unit 571 to one of the maps that are created beforehand based on an experimental rule, that are stored in the ROM, and that show correspondence between the front wheel-side target movement amount Lft and a front wheel-side target current.

The rear wheel-side target current determination unit 512 determines, for example, a rear wheel-side target current by assigning the rear wheel-side target movement amount Lrt determined by the rear wheel-side target movement amount determination unit 572 to one of the maps that are created beforehand based on an experimental rule, that are stored in the ROM, and that show correspondence between the rear wheel-side target movement amount Lrt and a rear wheel-side target current.

When determining a front wheel-side target current based on the front wheel-side target movement amount Lft determined by the front wheel-side target movement amount determination unit 571, the front wheel-side target current determination unit 511 may determine the front wheel-side target current by performing a feedback control based on a deviation between the front wheel-side target movement amount Lft determined by the front wheel-side target movement amount determination unit 571 and the front wheel-side movement amount Lf that is an actual amount (hereinafter occasionally referred to as "front wheel-side actual movement amount Lfa.") identified by the front wheel-side movement amount identifying unit 53 (see FIG. 12). Similarly, when determining a rear wheel-side target current based on the rear wheel-side target movement amount Lrt determined by the rear wheel-side target movement amount determination unit 572, the rear wheel-side target current determination unit 512 may determine the rear wheel-side target current by performing a feedback control based on a deviation between the rear wheel-side target movement amount Lrt determined by the rear wheel-side target movement amount determination unit 572 and the rear wheel-side movement amount Lr that is an actual amount (hereinafter occasionally referred to as "rear wheel-side actual movement amount Lra.") identified by the rear wheel-side movement amount identifying unit 54 (see FIG. 12).

The control unit 520 includes a front wheel-side operation control unit 530, a front wheel-side electromagnetic valve drive unit 533, and a front wheel-side detection unit 534. The front wheel-side operation control unit 530 controls how the front wheel-side electromagnetic valve 270 operates. The front wheel-side electromagnetic valve drive unit 533 drives the front wheel-side electromagnetic valve 270. The front wheel-side detection unit 534 detects an actual current actually flowing into the front wheel-side electromagnetic valve 270. The control unit 520 includes a rear wheel-side operation control unit 540, a rear wheel-side electromagnetic valve drive unit 543, and a rear wheel-side detection unit 544. The rear wheel-side operation control unit 540 controls how the rear wheel-side electromagnetic valve 170 operates. The rear wheel-side electromagnetic valve drive unit 543 drives the rear wheel-side electromagnetic valve 170. The rear wheel-side detection unit 544 detects an actual current actually flowing into the rear wheel-side electromagnetic valve 170.

The front wheel-side operation control unit 530 includes a front wheel-side feedback (F/B) control unit 531 and a front wheel-side pulse width modulation (PWM) control unit 532. The front wheel-side F/B control unit 531 performs a feedback control based on a deviation between a front wheel-side target current determined by the front wheel-side target current determination unit 511 and an actual current (front wheel-side actual current) detected by the front wheel-side detection unit 534. The front wheel-side PWM control unit 532 controls a PWM for the front wheel-side electromagnetic valve 270.

The rear wheel-side operation control unit 540 includes a rear wheel-side feedback (F/B) control unit 541 and a rear wheel-side pulse width modulation (PWM) control unit 542. The rear wheel-side F/B control unit 541 performs a feedback control based on a deviation between a rear wheel-side target current determined by the rear wheel-side target current determination unit 512 and an actual current (rear wheel-side actual current) detected by the rear wheel-side detection unit 544. The rear wheel-side PWM control unit 542 controls a PWM for the rear wheel-side electromagnetic valve 170.

The front wheel-side feedback control unit 531 obtains a deviation between a front wheel-side target current and a front wheel-side actual current detected by the front wheel-side detection unit 534, and performs a feedback process so that the deviation reaches zero. The rear wheel-side feedback control unit 541 obtains a deviation between a rear wheel-side target current and a rear wheel-side actual current detected by the rear wheel-side detection unit 544, and performs a feedback process so that the deviation reaches zero. An example of the front wheel-side feedback control unit 531 can be one that performs, for example, a proportional process with a proportional element and an integration process with an integration element for a deviation between a front wheel-side target current and a front wheel-side actual current to sum the obtained values with an addition arithmetic operation unit. Another example of the front wheel-side feedback control unit 531 can be one that performs, for example, in addition to a proportional process with a proportional element and an integration process with an integration element, as described above, a differentiation process with a differentiation element for a deviation between a target current and an actual current to sum the obtained values with the addition arithmetic operation unit. Similarly, an example of the rear wheel-side feedback control unit 541 can be one that performs, for example, a proportional process with a proportional element and an integration process with an integration element for a deviation between a rear wheel-side target current and a rear wheel-side actual current to sum the obtained values with an addition arithmetic operation unit. Another example of the rear wheel-side feedback control unit 541 can be one that performs, for example, in addition to a proportional process with a proportional element and an integration process with an integration element, as described above, a differentiation process with a differentiation element for a deviation between a target current and an actual current to sum the obtained values with the addition arithmetic operation unit.

The front wheel-side PWM control unit 532 changes a duty ratio with a pulse width (t) in a constant period (T) (=t/T×100(%)) to control a PWM for the front wheel-side electromagnetic valve 270 for its opening degree (voltage to be applied to the coil of the front wheel-side electromagnetic valve 270). Upon the PWM is controlled, a voltage corresponding to the duty ratio is applied to the coil of the front wheel-side electromagnetic valve 270 in a pulse manner. At this time, due to an impedance of the coil 271, a current flowing into the coil 271 of the front wheel-side electromagnetic valve 270 cannot change fully in accordance with the voltage to be applied in a pulse manner, but is somewhat blurred and output, and thus the current flowing into the coil of the front wheel-side electromagnetic valve 270 increases or decreases in proportion to the duty ratio. For example, the front wheel-side PWM control unit 532 can set a duty ratio to zero when a front wheel-side target current is zero, as well as can set a duty ratio to 100% when a front wheel-side target current is a maximum current, described above, or a first target current A1, described later.

Similarly, the rear wheel-side PWM control unit 542 changes a duty ratio to control a PWM for the rear wheel-side electromagnetic valve 170 for its opening degree (voltage to be applied to the coil of the rear wheel-side electromagnetic valve 170). Upon the PWM is controlled, a voltage corresponding to the duty ratio is applied to the coil 171 of the rear wheel-side electromagnetic valve 170 in a pulse manner, and a current flowing into the coil 171 of the rear wheel-side electromagnetic valve 170 increases or decreases in proportion to the duty ratio. For example, the rear wheel-side PWM control unit 542 can set a duty ratio to zero when a rear wheel-side target current is zero, as well as can set a duty ratio to 100% when a rear wheel-side target current is a maximum current, as described above, or a second target current A2, described later.

The front wheel-side electromagnetic valve drive unit 533 includes, for example, a transistor (field effect transistor (FET)) coupled, for use as a switching element, between a positive electrode-side line of a power supply and the coil of the front wheel-side electromagnetic valve 270. The front wheel-side electromagnetic valve 270 is drivingly controlled by driving a gate of the transistor for switching. The rear wheel-side electromagnetic valve drive unit 543 includes, for example, a transistor coupled between the positive electrode-side line of the power supply and the coil of the rear wheel-side electromagnetic valve 170. The rear wheel-side electromagnetic valve 170 is drivingly controlled by driving a gate of the transistor for switching.

The front wheel-side detection unit 534 detects a value of an actual current flowing into the front wheel-side electromagnetic valve 270 based on a voltage between both ends of a shunt resistor coupled to the front wheel-side electromagnetic valve drive unit 533. The rear wheel-side detection unit 544 detects a value of an actual current flowing into the rear wheel-side electromagnetic valve 170 based on a voltage between both ends of a shunt resistor coupled to the rear wheel-side electromagnetic valve drive unit 543.

In the motorcycle 1 with the configuration described hereinbefore, the electromagnetic valve control unit 57 of the control device 50 determines a target current based on a target movement amount corresponding to a weight applied to the motorcycle 1 to control a PWM so that an actual current to be supplied to the front wheel-side electromagnetic valve 270 and the rear wheel-side electromagnetic valve 170 reaches the determined target current. In other words, the front wheel-side PWM control unit 532 and the rear wheel-side PWM control unit 542 of the electromagnetic valve control unit 57 respectively change a duty ratio to control electric power to be supplied to the coils 271 and 171 of the front wheel-side electromagnetic valve 270 and the rear wheel-side electromagnetic valve 170, that is, to control the front wheel-side electromagnetic valve 270 and the rear wheel-side electromagnetic valve 170 to respectively open at desired opening degrees. Therefore, by controlling the front wheel-side electromagnetic valve 270 and the rear wheel-side electromagnetic valve 170 for their opening degrees to control upper limit amounts for fluid (oil) flowing into the jack chamber 242 and the jack chamber 142, the control device 50 can change target movement amounts in accordance with a weight applied to the motorcycle 1 in conformity to the target movement amounts shown in FIGS. 14A and 14B. In the interrelations between a weight applied to the motorcycle 1 and a target movement amount shown in FIGS. 14A and 14B, the front wheel-side target movement amount Lft and the rear wheel-side target movement amount Lrt are increased, as a weight increases. Therefore, as a weight applied to the motorcycle 1 increases, initial loads for the front wheel-side suspension spring 210 and the rear wheel-side suspension spring 110 are increased. Accordingly, when a weight applied to the motorcycle 1 is greater, the front forks 21 and the rear suspension 22 contract less easily. Meanwhile, when a weight applied to the motorcycle is smaller, the front forks 21 and the rear suspension 22 contract easily. Accordingly, even when a weight applied to the motorcycle 1 varies, a desired vehicle height can be maintained. As a result, regardless of a size of a rider, or even when a rider rides the motorcycle with a passenger or a heavy load, a desired vehicle height can be maintained while traveling. The rider is thus able to ride the motorcycle comfortably and stably in an improved manner.

A method for how the weight estimation unit 58 estimates a weight applied to the motorcycle 1 will now be described herein.

Since the length of the rear suspension 22 and the vehicle height of the motorcycle 1 are directly linked, a target length for the rear suspension 22 has been set beforehand so as to correspond to a height selected by a user via the vehicle height adjustment switch (not shown), as described above. A target length for the rear suspension 22 will hereinafter be referred to as "rear wheel-side target length Srt."

The weight estimation unit 58 estimates a weight based on the rear wheel-side movement amount Lr that is an actual amount (hereinafter occasionally referred to as "rear wheel-side actual movement amount Lra.") when an actual rear wheel-side length (hereinafter occasionally referred to as "rear wheel-side actual length Sra.") identified by the rear wheel-side length identifying unit 55 has reached the rear wheel-side target length Srt.

More specifically, the weight estimation unit 58 first sets a temporary weight. The rear wheel-side target movement amount determination unit 572 uses one of the maps for control illustrated in FIG. 14B to determine the rear wheel-side target movement amount Lrt corresponding to the temporary weight set by the weight estimation unit 58. After the motorcycle 1 has started traveling, and the vehicle speed Vc has increased from a speed less than the increasing vehicle speed Vu to the increasing vehicle speed Vu or larger, the electromagnetic valve control unit 57 controls the rear wheel-side electromagnetic valve 170 for its opening degree so that the rear wheel-side movement amount Lr reaches the rear wheel-side target movement amount Lrt. When the temporary weight set by the weight estimation unit 58 and a weight actually applied to the motorcycle 1 (hereinafter referred to as "actual weight.") match, the rear wheel-side movement amount Lr that is an actual amount (rear wheel-side actual movement amount Lra) reaches the rear wheel-side target movement amount Lrt, as well as the rear wheel-side length Ls that is an actual length (rear wheel-side actual length Sra) reaches the rear wheel-side target length Srt. In such a case, the weight estimation unit 58 estimates that the set temporary weight and the actual weight match.

On the other hand, for example, when the temporary weight set by the weight estimation unit 58 and the actual weight do not match, the rear wheel-side actual length Sra may reach the rear wheel-side target length Srt, even when the rear wheel-side actual movement amount Lra has not yet reached the rear wheel-side target movement amount Lrt. The rear wheel-side actual length Sra may not reach the rear wheel-side target length Srt, even when the rear wheel-side actual movement amount Lra has reached the rear wheel-side target movement amount Lrt. In the former case, it can be assumed that the actual weight be lighter than the temporary weight set by the weight estimation unit 58. In the latter case, it can be assumed that the actual weight be heavier than the temporary weight.

In the former case, that is, the rear wheel-side actual length Sra has reached the rear wheel-side target length Srt, even when the rear wheel-side actual movement amount Lra has not yet reached the rear wheel-side target movement amount Lrt, the weight estimation unit 58 estimates a weight based on the rear wheel-side actual movement amount Lra at the time when the rear wheel-side actual length Sra has reached the rear wheel-side target length Srt, and one of the maps for control illustrated in FIG. 14B. In other words, the weight estimation unit 58 estimates as the actual weight a weight corresponding to the rear wheel-side actual movement amount Lra at the time when the rear wheel-side actual length Sra has reached the rear wheel-side target length Srt in one of the maps for control illustrated in FIG. 14B.

In the latter case, that is, when the rear wheel-side actual length Sra has not yet reached the rear wheel-side target length Srt, even when the rear wheel-side actual movement amount Lra has reached the rear wheel-side target movement amount Lrt, the weight estimation unit 58 changes the temporary weight until the rear wheel-side actual length Sra reaches the rear wheel-side target length Srt. The weight estimation unit 58 estimates as the actual weight a weight corresponding to the rear wheel-side actual movement amount Lra at the time when the rear wheel-side actual length Sra has finally reached the rear wheel-side target length Srt. More specifically, (1) when the rear wheel-side actual length Sra has not yet reached the rear wheel-side target length Srt, even when the rear wheel-side actual movement amount Lra has reached the rear wheel-side target movement amount Lrt, the weight estimation unit 58 newly sets as the temporary weight a weight that is a sum of the currently set temporary weight and a predetermined value α. The rear wheel-side target movement amount determination unit 572 then uses one of the maps for control illustrated in FIG. 14B to newly determine the rear wheel-side target movement amount Lrt corresponding to the temporary weight that is set anew by the weight estimation unit 58. Since the temporary weight that is set anew is heavier by a than the previous temporary weight, the newly determined rear wheel-side target movement amount Lrt is larger by a. The electromagnetic valve control unit 57 controls the rear wheel-side electromagnetic valve 170 for its opening degree so that the rear wheel-side actual movement amount Lra reaches the rear wheel-side target movement amount Lrt that is newly determined. Therefore, the rear wheel-side actual movement amount Lra is increased. The rear wheel-side actual length Sra accordingly extends longer.

(2) Since, when the temporary weight newly set by the weight estimation unit 58 and an actual weight match, the rear wheel-side actual movement amount Lra reaches the rear wheel-side target movement amount Lrt, and the rear wheel-side actual length Sra reaches the rear wheel-side target length Srt, the weight estimation unit 58 estimates that the set temporary weight and the actual weight match. (3) On the other hand, when the temporary weight newly set by the weight estimation unit 58 and the actual weight do not match, and the rear wheel-side actual length Sra has reached the rear wheel-side target length Srt, even when the rear wheel-side actual movement amount Lra has not yet reached the rear wheel-side target movement amount Lrt, the weight estimation unit 58 estimates, as described above, a weight based on the rear wheel-side actual movement amount Lra at the time when the rear wheel-side actual length Sra has reached the rear wheel-side target length Srt, and one of the maps for control illustrated in FIG. 14B. Meanwhile, when the temporary weight newly set by the weight estimation unit 58 and the actual weight do not match, and the rear wheel-side actual length Sra has not yet reached the rear wheel-side target length Srt, even when the rear wheel-side actual movement amount Lra has reached the rear wheel-side target movement amount Lrt, the weight estimation unit 58 newly sets as the temporary weight a weight that is a sum of the currently set temporary weight and a. As described above, the weight estimation unit 58 estimates a weight by repeating (1) to (3), described above, until the rear wheel-side actual length Sra reaches the rear wheel-side target length Srt.

However, when the temporary weight newly set by the weight estimation unit 58 and an actual weight do not match, when the rear wheel-side actual length Sra has not yet reached the rear wheel-side target length Srt, even when the rear wheel-side actual movement amount Lra has reached the rear wheel-side target movement amount Lrt, and when the temporary weight newly set by the weight estimation unit 58 has exceeded the predetermined weight Wp, the rear wheel-side actual movement amount Lra does not increase much since the rear wheel-side actual movement amount Lra has reached the rear wheel-side upper limit movement amount Lrmax. As a result, when the temporary weight newly set by the weight estimation unit 58 exceeds the predetermined weight Wp, the rear wheel-side actual length Sra can hardly reach the rear wheel-side target length Srt. In such a case, when the temporary weight newly set by the weight estimation unit 58 has exceeded the predetermined weight Wp, the rear wheel-side target length Srt is shortened. For example, even when a user has selected "high" via the vehicle height adjustment switch, the rear wheel-side target movement amount determination unit 572 sets the rear wheel-side target length Srt to "medium," instead of "long" that corresponds to the vehicle height adjustment switch. The rear wheel-side target movement amount determination unit 572 then determines the rear wheel-side target movement amount Lrt using one of the maps, for when the rear wheel-side target length Srt is "medium." When the rear wheel-side target length Srt has been decreased, the weight estimation unit 58 selects and sets as a temporary weight a lightest weight from among weights with which the rear wheel-side target movement amount Lrt reaches the rear wheel-side upper limit movement amount Lrmax under the rear wheel-side target length Srt that is set a new. When the rear wheel-side target length Srt that is set anew is "medium," the weight estimation unit 58 sets as a temporary weight the predetermined weight Wp for when the rear wheel-side target length Srt is "medium." Therefore, the rear wheel-side actual movement amount Lra is kept unchanged, but the rear wheel-side target length Srt is decreased. The weight estimation unit 58 decreases the rear wheel-side target length Srt until the rear wheel-side actual length Sra reaches the rear wheel-side target length Srt, and estimates as an actual weight a temporary weight when the rear wheel-side actual length Sra has finally reached the rear wheel-side target length Srt.

When setting a temporary weight for the first time, the weight estimation unit 58 can set an initial weight (e.g., 40 kg) stored beforehand in the ROM, for example. Once an actual weight is estimated, the weight estimation unit 58 may rewrite the initial weight stored in the ROM with the estimated weight, and may set, when estimating an actual weight for the next time, the rewritten weight as an initial temporary weight.

When the weight estimation unit 58 has estimated an actual weight, the front wheel-side target movement amount determination unit 571 and the rear wheel-side target movement amount determination unit 572 may determine, based on the estimated weight, until the vehicle speed Vc reaches 0 after estimated, the front wheel-side minimum target movement amount Lftn, the rear wheel-side minimum target movement amount Lrtn, the front wheel-side maximum target movement amount Lftx, and the rear wheel-side maximum target movement amount Lrtx.

How the weight estimation unit 58 performs a weight estimation process will now be described herein with reference to a flowchart.

Figure 15:
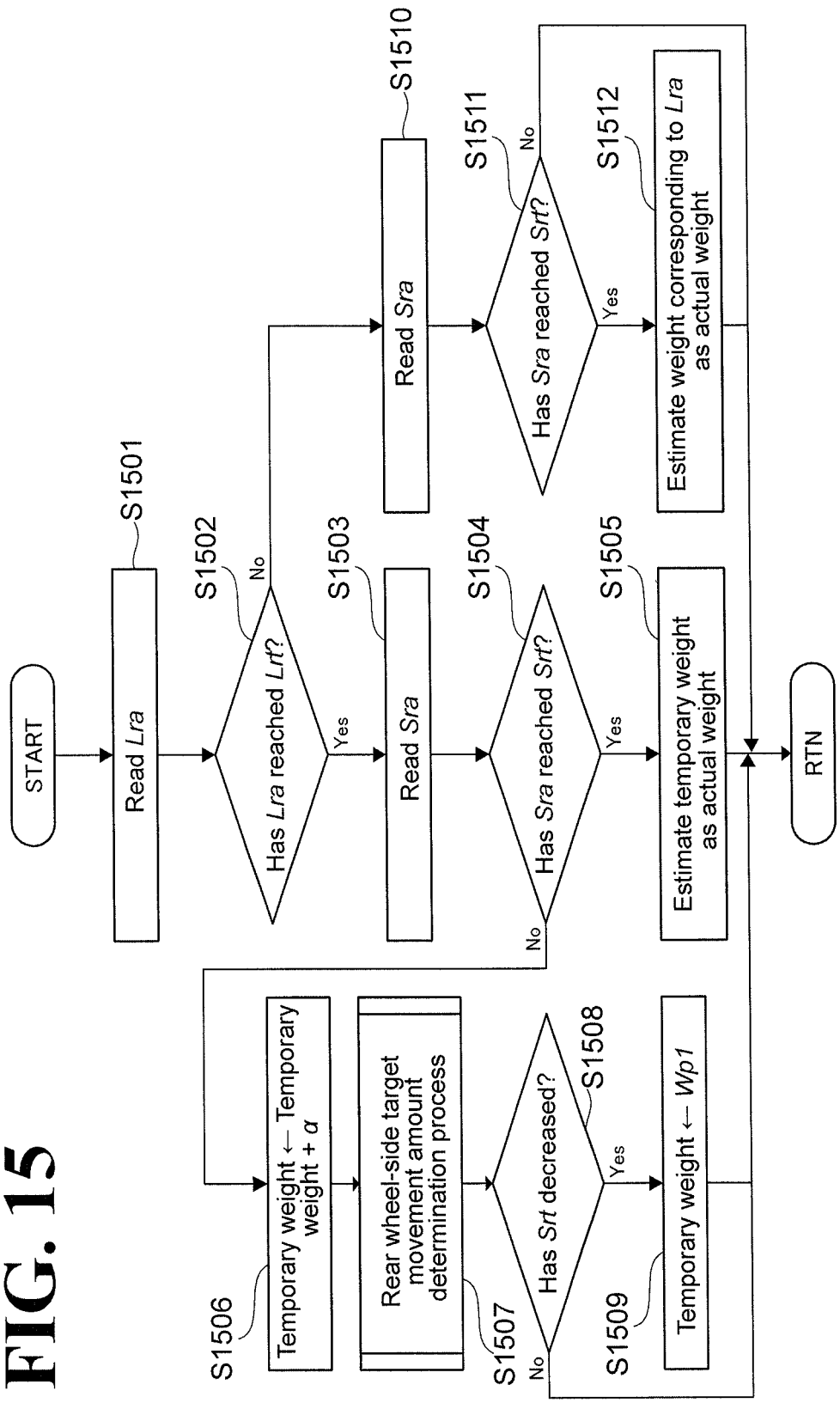
FIG. 15 is a flowchart illustrating how the weight estimation unit performs a weight estimation process.

FIG. 15 is a flowchart illustrating how the weight estimation unit 58 performs a weight estimation process.

After the motorcycle 1 has started traveling, the weight estimation unit 58 begins a weight estimation process at the time when the vehicle speed Vc has increased from a speed less than the increasing vehicle speed Vu to the increasing vehicle speed Vu or larger, and repeatedly executes the weight estimation process per a predetermined period (e.g., one millisecond), for example, while the vehicle speed Vc is equal to or larger than the increasing vehicle speed Vu.

The weight estimation unit 58 first reads the rear wheel-side movement amount Lr that is an actual amount (rear wheel-side actual movement amount Lra) identified by the rear wheel-side movement amount identifying unit 54 (see FIG. 12) (S1501), and determines whether the rear wheel-side actual movement amount Lra identified by the rear wheel-side movement amount identifying unit 54 has reached the rear wheel-side target movement amount Lrt (S1502).

When the rear wheel-side actual movement amount Lra has reached the rear wheel-side target movement amount Lrt (Yes in S1502), the weight estimation unit 58 reads the rear wheel-side length Ls that is an actual length (rear wheel-side actual length Sra) identified by the rear wheel-side length identifying unit 55 (see FIG. 12) (S1503), and determines whether the rear wheel-side actual length Sra has reached the rear wheel-side target length Srt (S1504).

When the rear wheel-side actual length Sra has reached the rear wheel-side target length Srt (Yes in S1504), the weight estimation unit 58 estimates as an actual weight applied to the motorcycle 1 a weight corresponding to the rear wheel-side actual movement amount Lra read in S1501 (S1505). In other words, the weight estimation unit 58 estimates as the actual weight a temporary weight since the rear wheel-side actual length Sra has reached the rear wheel-side target length Srt. For example, the weight estimation unit 58 can estimate an actual weight based on the rear wheel-side actual movement amount Lra, and one of the maps for control illustrated in FIG. 14B, for example.

Meanwhile, when the rear wheel-side actual length Sra has not yet reached the rear wheel-side target length Srt (No in S1504), the weight estimation unit 58 newly sets as a temporary weight a weight that is a sum of the present temporary weight and the predetermined value α (S1506). The rear wheel-side target movement amount determination unit 572 is then caused to execute a rear wheel-side target movement amount determination process, described later (S1507). The weight estimation unit 58 then determines whether the rear wheel-side target length Srt has been decreased through the rear wheel-side target movement amount determination process in S1507 (S1508). When the rear wheel-side target length Srt has been decreased (Yes in S1508), the weight estimation unit 58 sets as a temporary weight the predetermined weight Wp under the rear wheel-side target length Srt that is set anew (S1509). Meanwhile, when the rear wheel-side target length Srt has not yet decreased (No in S1508), the process ends.

On the other hand, when the rear wheel-side actual movement amount Lra has not yet reached the rear wheel-side target movement amount Lrt (No in S1502), the weight estimation unit 58 reads the rear wheel-side actual length Sra (S1510), and determines whether the rear wheel-side actual length Sra has reached the rear wheel-side target length Srt (S1511).

When the rear wheel-side actual length Sra has reached the rear wheel-side target length Srt (Yes in S1511), the weight estimation unit 58 estimates as an actual weight applied to the motorcycle 1 a weight corresponding to the rear wheel-side actual movement amount Lra read in S1501 (S1512). Meanwhile, when the rear wheel-side actual length Sra has not yet reached the rear wheel-side target length Srt (No in S1511), the weight estimation unit 58 ends the process.

Since the weight estimation unit 58 has set the weight as the new temporary weight in S1506, the rear wheel-side target movement amount determination unit 572 newly determines the rear wheel-side target movement amount Lrt corresponding to the temporary weight newly set by the weight estimation unit 58. The electromagnetic valve control unit 57 then controls the rear wheel-side electromagnetic valve 170 for its opening degree so that the rear wheel-side actual movement amount Lra reaches the rear wheel-side target movement amount Lrt that is newly determined.

Therefore, the rear wheel-side actual movement amount Lra is increased. Accordingly, even when the rear wheel-side actual movement amount Lra has reached the rear wheel-side target movement amount Lrt in S1502 of the previous weight estimation process, it will be determined whether the rear wheel-side actual movement amount Lra be reached the rear wheel-side target movement amount Lrt that is newly determined in S1502 of this weight estimation process. The weight estimation process will be repeated until it is finally determined that the rear wheel-side actual length Sra has reached the rear wheel-side target length Srt in S1504 or S1511 and a weight is estimated based on the rear wheel-side actual movement amount Lra at the time when the rear wheel-side actual length Sra has reached the rear wheel-side target length Srt in S1505 or S1512.

How the rear wheel-side target movement amount determination unit 572 performs a rear wheel-side target movement amount determination process will now be described herein with reference to a flowchart.

Figure 16:
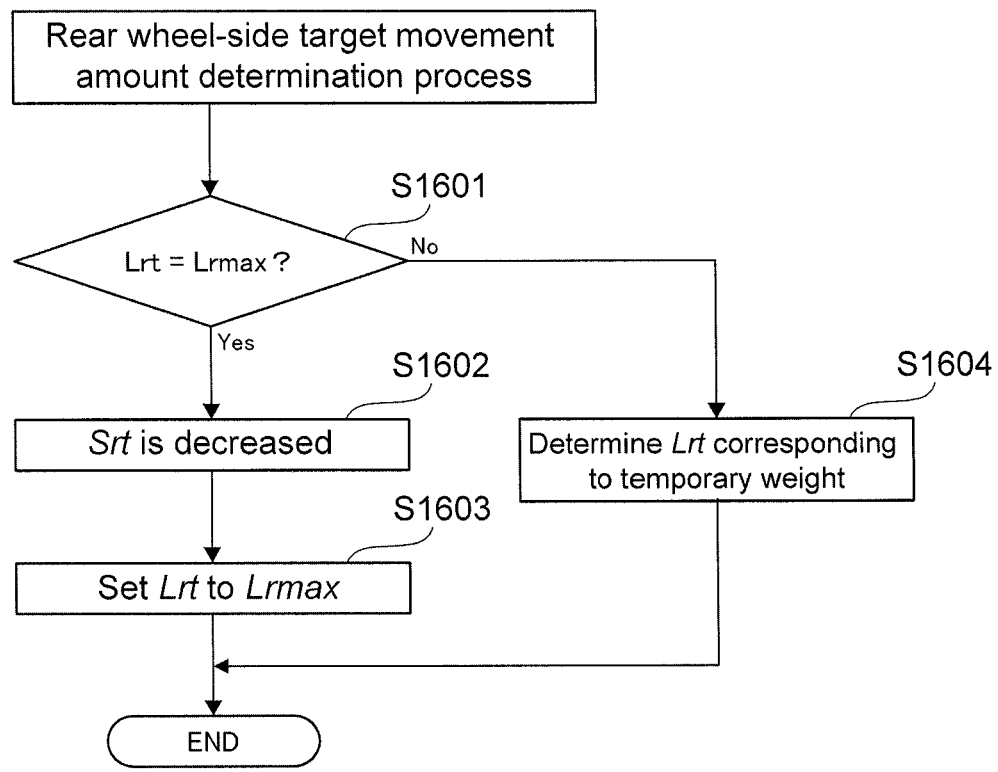
FIG. 16 is a flowchart illustrating how the rear wheel-side target movement amount determination unit performs a rear wheel-side target movement amount determination process.

FIG. 16 is a flowchart illustrating how the rear wheel-side target movement amount determination unit 572 performs a rear wheel-side target movement amount determination process.

The rear wheel-side target movement amount determination unit 572 determines whether the rear wheel-side target movement amount Lrt that is a present amount is the rear wheel-side upper limit movement amount Lrmax (S1601). When the rear wheel-side target movement amount Lrt that is the present amount is the rear wheel-side upper limit movement amount Lrmax (Yes in S1601), the rear wheel-side target length Srt is decreased (S1602). In this embodiment, since the rear wheel-side target length Srt can be set in five stages, the rear wheel-side target length Srt is decreased by one stage, for example. The rear wheel-side target movement amount Lrt is then set to the rear wheel-side upper limit movement amount Lrmax (S1603).

Meanwhile, when the rear wheel-side target movement amount Lrt that is the present amount is not the rear wheel-side upper limit movement amount Lrmax (No in S1601), the rear wheel-side target movement amount Lrt corresponding to the temporary weight set by the weight estimation unit 58 is set (S1604).

When the rear wheel-side target length Srt has been decreased in S1602 of the rear wheel-side target movement amount determination process shown in FIG. 16, it will be determined whether the rear wheel-side actual length Sra be reached the rear wheel-side target length Srt that will be set anew, in S1504 of the next weight estimation process to be performed by the weight estimation unit 58. When the rear wheel-side actual length Sra has reached the rear wheel-side target length Srt that is set anew (Yes in S1504), the weight estimation unit 58 estimates as an actual weight applied to the motorcycle 1 a weight corresponding to the rear wheel-side actual movement amount Lra read in S1501 (S1505). The rear wheel-side actual movement amount Lra to be read in S1501 of a weight estimation process to be performed after the rear wheel-side target length Srt has been decreased in S1602 of the rear wheel-side target movement amount determination process is the rear wheel-side upper limit movement amount Lrmax since it has been determined that the rear wheel-side actual movement amount Lra has reached the rear wheel-side target movement amount Lrt in S1502 of the previous weight estimation process (Yes in S1502), and it has been determined that the rear wheel-side target movement amount Lrt is the rear wheel-side upper limit movement amount Lrmax in S1601. The weight estimation unit 58 then selects and sets a lightest weight from among weights with which the rear wheel-side target movement amount Lrt reaches the rear wheel-side upper limit movement amount Lrmax under the rear wheel-side target length Srt that is set anew, as a weight that corresponds to the rear wheel-side actual movement amount Lra read in S1501, and that is estimated as an actual weight in S1505 of the weight estimation process. In other words, the weight estimation unit 58 estimates as an actual weight the predetermined weight Wp under the rear wheel-side target length Srt, which is set as a temporary weight in S1509 of the weight estimation process.

[Actions and Effects of Control Device According to this Embodiment]

Figure 17A:
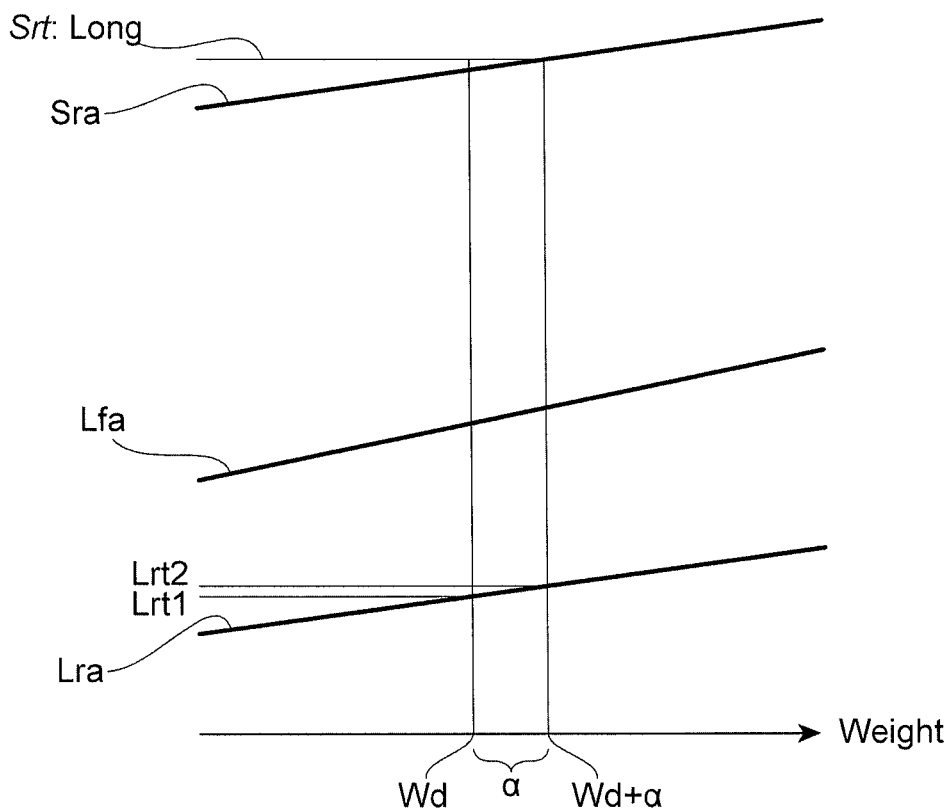
FIGS. 17A and 17B are graphs illustrating how the control device according to this embodiment operates.
Figure 17B:
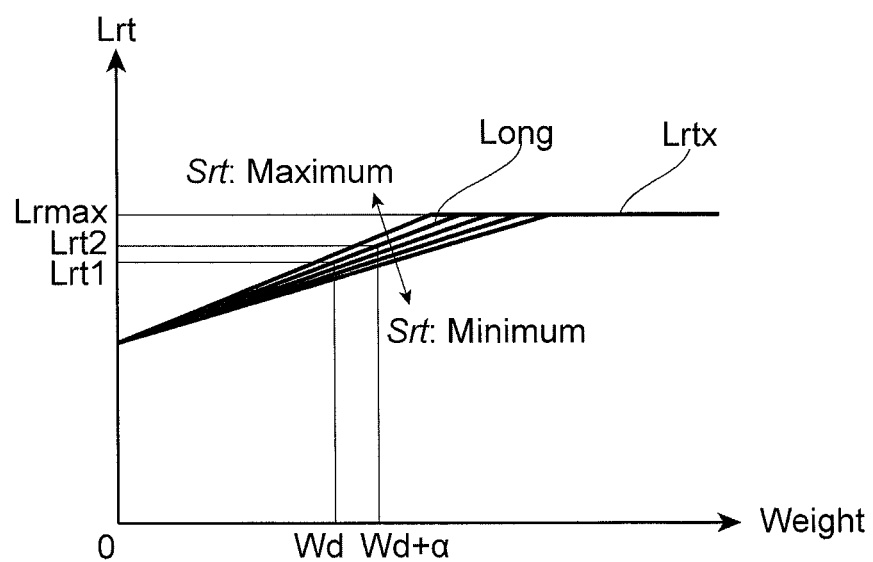

FIGS. 17A and 17B are graphs illustrating how the control device 50 according to this embodiment operates. FIGS. 17A and 17B illustrate a case where the rear wheel-side target length Srt is "long," and, before the rear wheel-side target movement amount Lrt reaches the rear wheel-side upper limit movement amount Lrmax, the rear wheel-side actual movement amount Lra reaches the rear wheel-side target movement amount Lrt, and the rear wheel-side actual length Sra reaches the rear wheel-side target length Srt.

For example, as shown in FIG. 17A, when a temporary weight set by the weight estimation unit 58 is Wd, and when the rear wheel-side actual length Sra has not yet reached the rear wheel-side target length Srt (=long), even when the rear wheel-side actual movement amount Lra has reached a rear wheel-side target movement amount Lrt1, the weight estimation unit 58 makes a negative determination in S1504 of the weight estimation process. The weight estimation unit 58 then sets as a new temporary weight a weight that is a sum of the temporary weight Wd that is the present weight and the predetermined value $\alpha$(=Wd+$\alpha$) (S1506). In the rear wheel-side target movement amount determination process performed in S1507, the rear wheel-side target movement amount determination unit 572 determines that the rear wheel-side target movement amount Lrt1 that is a present amount is not the rear wheel-side upper limit movement amount Lrmax (No in S1601), and sets the rear wheel-side target movement amount Lrt to a rear wheel-side target movement amount Lrt2 shown in FIG. 17B in accordance with the temporary weight newly set in S1506 (=Wd+$\alpha$), one of the maps illustrated in FIG. 14A, and the rear wheel-side target length Srt (=long) (S1604). While the temporary weight newly set by the weight estimation unit 58 is Wd+$\alpha$, when the rear wheel-side actual movement amount Lra has reached the rear wheel-side target movement amount Lrt2, and the rear wheel-side actual length Sra has reached the rear wheel-side target length Srt (=long) (Yes in S1502 and S1504), a weight corresponding to the rear wheel-side actual movement amount Lra, that is, the temporary weight Wd+$\alpha$, is estimated as an actual weight (S1505).

Figure 18A:
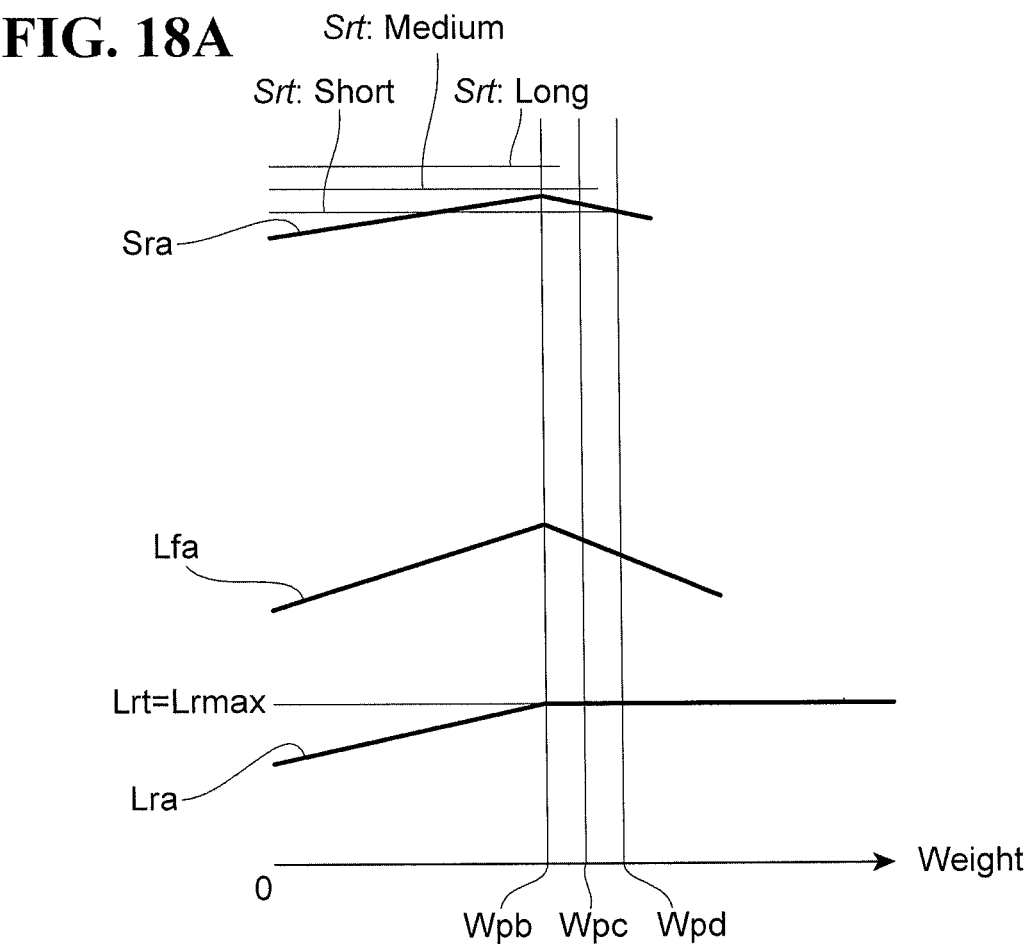
FIGS. 18A and 18B are graphs illustrating how the control device according to this embodiment operates.
Figure 18B:
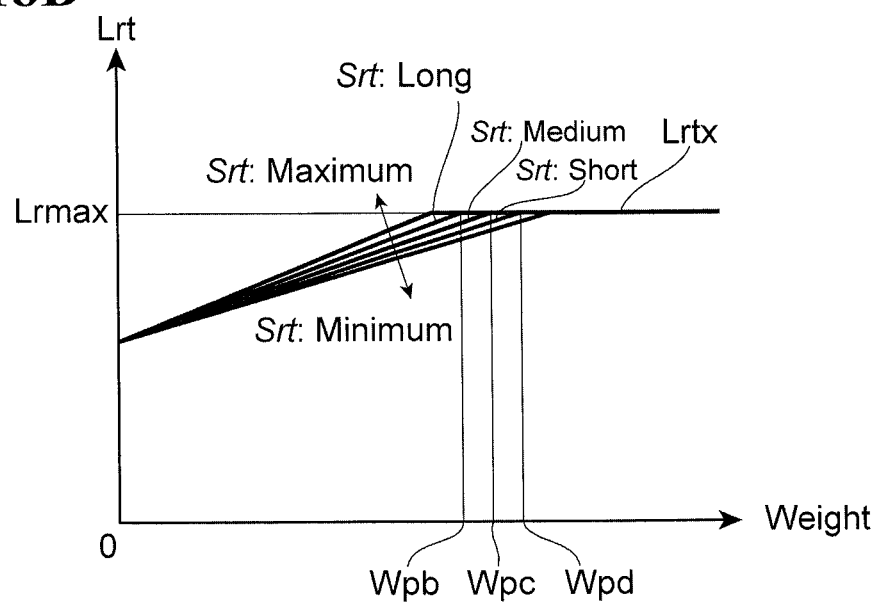

FIGS. 18A and 18B are graphs illustrating how the control device 50 according to this embodiment operates. FIGS. 18A and 18B illustrate a case where the rear wheel-side target length Srt is initially "long," and, after the rear wheel-side target movement amount Lrt has reached the rear wheel-side upper limit movement amount Lrmax, the rear wheel-side actual movement amount Lra reaches the rear wheel-side target movement amount Lrt, and the rear wheel-side actual length Sra reaches the rear wheel-side target length Srt.

For example, while a temporary weight set by the weight estimation unit 58 is the predetermined weight Wp when the rear wheel-side target length Srt is "long," that is, a predetermined weight (when long) Wpb, when the rear wheel-side actual length Sra has not yet reached the rear wheel-side target length Srt (=long) even when the rear wheel-side actual movement amount Lra has reached the rear wheel-side target movement amount Lrt, a negative determination is made in S1504 of the weight estimation process. A weight that is a sum of the present temporary weight, that is, the predetermined weight (when long) Wpb, and the predetermined value α is set as a new temporary weight (=Wpb+α) (S1506). In the rear wheel-side target movement amount determination process performed in S1507, the rear wheel-side target movement amount determination unit 572 determines that the rear wheel-side target movement amount Lrt that is a present amount is the rear wheel-side upper limit movement amount Lrmax (Yes in S1601), and decreases the rear wheel-side target length Srt one stage to "medium" (S1602). The rear wheel-side target movement amount Lrt is then set to the rear wheel-side upper limit movement amount Lrmax (S1603). A positive determination is then made in S1508 of the weight estimation process, and a predetermined weight (when medium) Wpc is set, which is the predetermined weight Wp when the rear wheel-side target length Srt that is set anew as a temporary weight is "medium" (S1509). In the next weight estimation process to be performed by the weight estimation unit 58, when the rear wheel-side actual length Sra does not reach the rear wheel-side target length Srt (=medium) even when the rear wheel-side actual movement amount Lra reaches the rear wheel-side target movement amount Lrt, a negative determination is made in S1504 of the weight estimation process. A weight that is a sum of the present temporary weight, that is, the predetermined weight (when medium) Wpc, and the predetermined value α is set as a new temporary weight (=Wpc+α) (S1506). In the rear wheel-side target movement amount determination process performed in S1507, the rear wheel-side target movement amount determination unit 572 determines that the rear wheel-side target movement amount Lrt that is a present amount is the rear wheel-side upper limit movement amount Lrmax (Yes in S1601), and decreases the rear wheel-side target length Srt one stage to "low" (S1602). The rear wheel-side target movement amount Lrt is then set to the rear wheel-side upper limit movement amount Lrmax (S1603). A positive determination is then made in S1508 of the weight estimation process, and a predetermined weight (when low) Wpd is set, which is the predetermined weight Wp when the rear wheel-side target length Srt that is set anew as a temporary weight is "low" (S1509). In the next weight estimation process to be performed by the weight estimation unit 58, when the rear wheel-side actual movement amount Lra reaches the rear wheel-side target movement amount Lrt, and the rear wheel-side actual length Sra reaches the rear wheel-side target length Srt (=short) (Yes in S1502 and S1504), the weight estimation unit 58 estimates as an actual weight the predetermined weight (when low) Wpd that is the predetermined weight Wp when the rear wheel-side target length Srt is "short," and that is a weight corresponding to the rear wheel-side upper limit movement amount Lrmax that is the rear wheel-side actual movement amount Lra, that is, a temporary weight.

As described above, in this embodiment, the rear wheel-side length variation amount detection unit 341 is included, and the rear wheel-side length identifying unit 55 identifies the rear wheel-side actual length Sra based on a value detected by the rear wheel-side length variation amount detection unit 341. The weight estimation unit 58 estimates a weight actually applied to the motorcycle 1 (actual weight) based on the rear wheel-side actual movement amount Lra and the rear wheel-side actual length Sra identified by the rear wheel-side length identifying unit 55. The electromagnetic valve control unit 57 controls the front wheel-side electromagnetic valve 270 for its opening degree and the rear wheel-side electromagnetic valve 170 for its opening degree based on the actual weight estimated by the weight estimation unit 58. Therefore, a cost reduction is achieved in device configuration since no front wheel-side length variation amount detection unit is required, compared with, for example, a configuration where, in addition to the rear wheel-side length variation amount detection unit 341, the front wheel-side length variation amount detection unit configured to detect an amount of variation in total length of each of the front forks 21 is included, and the electromagnetic valve control unit 57 controls the rear wheel-side electromagnetic valve 170 for its opening degree based on a value detected by the rear wheel-side length variation amount detection unit 341, as well as controls the front wheel-side electromagnetic valve 270 for its opening degree based on a value detected by the front wheel-side length variation amount detection unit. In this embodiment, the weight estimation unit 58 can precisely estimate an actual weight based on a value detected by the rear wheel-side length variation amount detection unit 341, instead of a value detected by a front wheel-side length variation amount detection unit, because, as shown in FIG. 1, an end of the rear suspension 22, which lies adjacent to the body 10, lies immediately below the seat 19, and thus the rear suspension 22 is more likely to be affected by a weight applied to the motorcycle 1 than the front forks 21.

However, an actual weight can hardly be estimated, even in a configuration where the weight estimation unit 58 is configured to estimate an actual weight based on the rear wheel-side actual movement amount Lra and the rear wheel-side actual length Sra, if the rear wheel-side actual length Sra has not yet reached the rear wheel-side target length Srt, even when the rear wheel-side actual movement amount Lra has reached the rear wheel-side target movement amount Lrt, and if the rear wheel-side actual movement amount Lra has reached the rear wheel-side upper limit movement amount Lrmax. In such a case, since the rear wheel-side actual movement amount Lra has reached the rear wheel-side upper limit movement amount Lrmax, the rear wheel-side target movement amount Lrt does not increase, and thus the rear wheel-side actual length Sra can hardly increase. As a result, the rear wheel-side actual length Sra can hardly reach the rear wheel-side target length Srt, and thus the weight estimation unit 58 faces difficulty in estimating an actual weight.

In contrast, in the control device 50 according to this embodiment, since the rear wheel-side target length Srt is decreased after the rear wheel-side actual movement amount Lra has reached the rear wheel-side upper limit movement amount Lrmax, the rear wheel-side actual length Sra can easily reach the rear wheel-side target length Srt. The weight estimation unit 58 can thus estimate a weight based on the rear wheel-side actual movement amount Lra at the time when the rear wheel-side actual length Sra has reached the rear wheel-side target length Srt.

As described above, in the control device 50 according to this embodiment, even when the rear wheel-side actual movement amount Lra falls in a range in which the rear wheel-side actual movement amount Lra can reach the rear wheel-side upper limit movement amount Lrmax, a weight applied to the motorcycle 1 can precisely be estimated.

Since the rear wheel-side target movement amount determination unit 572 does not decrease the rear wheel-side target movement amount Lrt when the rear wheel-side target length Srt is decreased after the rear wheel-side actual movement amount Lra has reached the rear wheel-side upper limit movement amount Lrmax, a sudden decrease in vehicle height is less likely to occur while increasing the vehicle height. Therefore, improved riding stability can be achieved, compared with a configuration where, when the rear wheel-side target length Srt is decreased, the rear wheel-side target movement amount Lrt is also decreased.

However, when estimating an actual weight based on the rear wheel-side actual movement amount Lra and the rear wheel-side actual length Sra, the weight estimation unit 58 faces difficulty in identifying whether a rider is riding the motorcycle solely, or with a passenger or a load behind the rider, that is, with a passenger on a tandem seat of the seat 19 or a load on a carrier, for example. In each of the maps for control illustrated in FIGS. 14A and 14B, a case where a rider is supposed to ride the motorcycle solely is illustrated, and correspondence between a weight and the rear wheel-side target movement amount Lrt is specified. Thus, it is difficult to precisely estimate an actual weight when there is a passenger or a load behind the rider, because the rear suspension 22 shortens in length when there is a passenger or a load behind the rider, compared with a case when the rider is riding the motorcycle solely, even when an actual weight is identical. Accordingly, in a configuration where the weight estimation unit 58 estimates an actual weight based on the rear wheel-side actual movement amount Lra and the rear wheel-side actual length Sra, it may be erroneously determined that an actual weight is heavier when there is a passenger or a load behind the rider, than when the rider is riding the motorcycle solely, even when the actual weight is identical. Since the front wheel-side target movement amount determination unit 571 determines the front wheel-side target movement amount Lft based on the weight estimated by the weight estimation unit 58, when there is a passenger or a load behind the rider, the front wheel-side target movement amount determination unit 571 may erroneously determine the front wheel-side target movement amount Lft that is greater than the front wheel-side target movement amount Lft when the rider rides the motorcycle solely. As a result, when there is a passenger or a load behind the rider, the front wheel-side movement amount Lf that is an actual amount (hereinafter occasionally referred to as "front wheel-side actual movement amount Lfa.") may become larger than the front wheel-side movement amount Lf that is an actual amount when the rider is riding the motorcycle solely, even when the actual weight is identical. As a result, when there is a passenger or a load behind the rider, a height of an end of each of the front forks 21, which lies adjacent to a side of the body 10, (hereinafter occasionally referred to as "front wheel-side height.") may be greater than a height of the end of each of the front forks 21, which lies near the side of the body 10, (front wheel-side height) when the rider rides the motorcycle solely, even when an actual weight is identical. On the other hand, since an end of the rear suspension 22, which lies adjacent to the body 10, lies immediately below the seat 19, it can be assumed that there will be a less difference in the rear wheel-side actual movement amount Lra between a case when there is a passenger or a load behind the rider and a case when the rider rides the motorcycle solely, and thus there will be a less difference in height of the end of the rear suspension 22, which lies near the body 10, (hereinafter referred to as "rear wheel-side height."). As described above, the front wheel-side height with respect to the rear wheel-side height when there is a passenger or a load behind the rider may become greater than the front wheel-side height with respect to the rear wheel-side height when the rider is riding the motorcycle solely, the motorcycle may fail to attain a desired vehicle posture, and thus the rider may not able to ride the motorcycle stably, as well as an optical axis of the head lamp 18 may be affected.

Figure 19A:
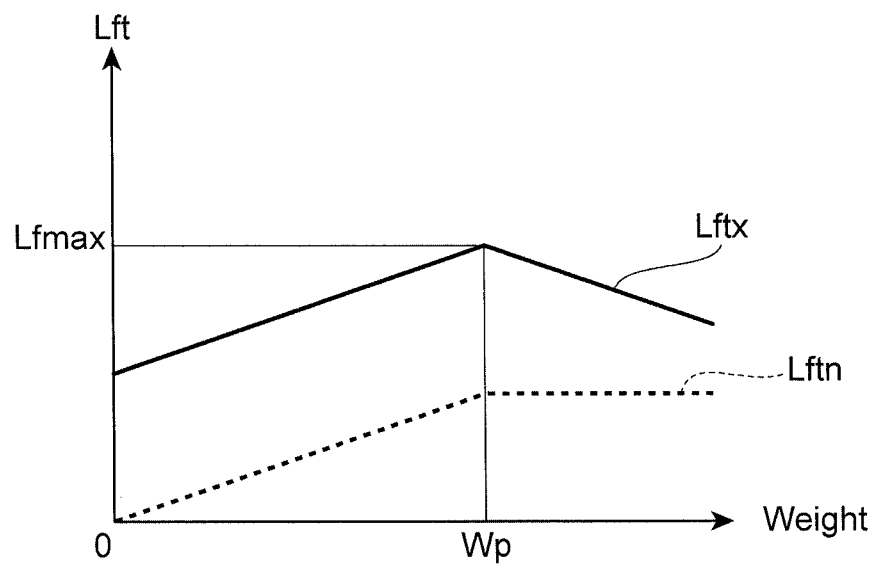
FIG. 19A is a graph illustrating an interrelation between a weight estimated by or a temporary weight set by the weight estimation unit and a front wheel-side target movement amount.
Figure 19B:
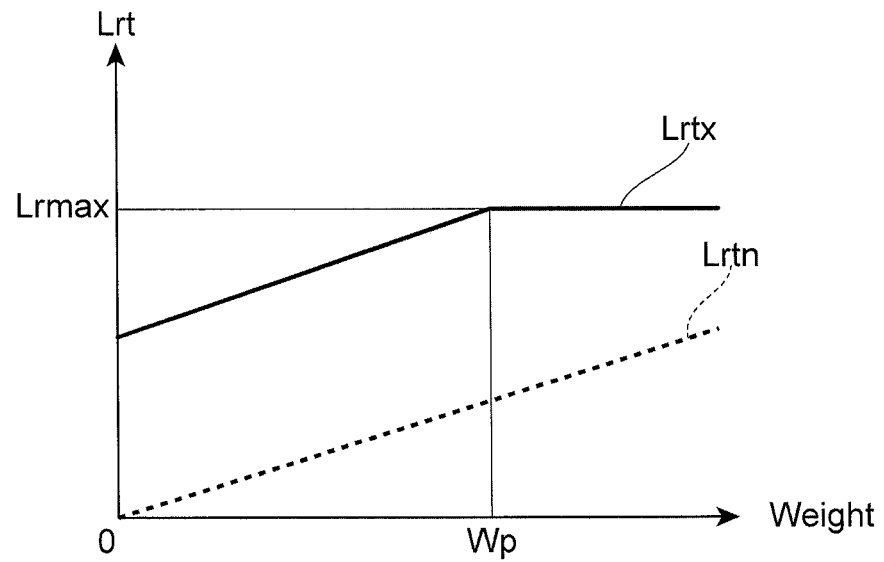
FIG. 19B is a graph illustrating an interrelation between a weight estimated by or a temporary weight set by the weight estimation unit and a rear wheel-side target movement amount.

FIG. 19A is a graph illustrating an interrelation between a weight estimated by or a temporary weight set by the weight estimation unit 58 and the front wheel-side target movement amount Lft. FIG. 19B is a graph illustrating an interrelation between a weight estimated by or a temporary weight set by the weight estimation unit 58 and the rear wheel-side target movement amount Lrt. FIGS. 19A and 19B illustrate the interrelations when a user has selected "medium" via the vehicle height adjustment switch, and thus the front wheel-side target length Sft and the rear wheel-side target length Srt respectively are for "medium." The following illustrates a case when the user has selected "medium." However, the same will apply to when another height is selected.

In view of the above description, the control device 50 according to this embodiment decreases, when a weight estimated by the weight estimation unit 58 is equal to or larger than the predetermined weight Wp, the front wheel-side movement amount Lf that is an actual amount as the estimated weight increases. An example of the predetermined weight Wp can be a maximum weight assumed to be a weight of a rider when the rider is riding the motorcycle solely. In other words, when a weight estimated by the weight estimation unit 58 is equal to or larger than the predetermined weight Wp, it is estimated that there is a passenger or a load behind the rider, and the front wheel-side movement amount Lf that is an actual amount is decreased as the estimated weight increases. For example, the predetermined weight Wp can be 155 (kg) when a user has selected "medium" as a target height.

In other words, the predetermined weight Wp can be a minimum weight among weights with which, as shown in FIG. 14B, the rear wheel-side target movement amount Lrt is set to an upper limit value for the rear wheel-side movement amount Lr, that is, the rear wheel-side upper limit movement amount Lrmax. In such a case, when a weight estimated by the weight estimation unit 58 is equal to or larger than the predetermined weight Wp, the rear wheel-side target movement amount determination unit 572 sets the rear wheel-side target movement amount Lrt to the rear wheel-side upper limit movement amount Lrmax. Accordingly, since the rear wheel-side actual movement amount Lra reaches the rear wheel-side upper limit movement amount Lrmax under the predetermined weight Wp when an actual weight (estimated weight) is equal to or larger than the predetermined weight Wp, it can be assumed that the heavier the actual weight than the predetermined weight Wp, the lower the rear wheel-side height.

In order to decrease the front wheel-side movement amount Lf that is an actual amount (front wheel-side actual movement amount Lfa) as an actual weight becomes larger than the predetermined weight Wp, when the actual weight is equal to or larger than the predetermined weight Wp, the front wheel-side target movement amount determination unit 571 determines the front wheel-side target movement amount Lft so that, as an estimated weight becomes heavier than the predetermined weight Wp, the front wheel-side target movement amount Lft is decreased. In other words, as shown in FIG. 14A, the maps for control have been created such that, as a weight becomes heavier than the predetermined weight Wp, the front wheel-side target movement amount Lft is decreased.

Therefore, even when there is a passenger or a load behind the rider, the front wheel-side height can be controlled so that the front wheel-side height with respect to the rear wheel-side height does not excessively exceed the front wheel-side height with respect to the rear wheel-side height when the rider is riding the motorcycle solely. As a result, the motorcycle can attain a desired vehicle posture, and negative effects caused when an actual weight is estimated based on the rear wheel-side actual movement amount Lra and the rear wheel-side actual length Sra can be reduced. Thus, the rider will be able to ride the motorcycle stably, as well as the optical axis of the head lamp 18 would be less likely to be affected.

<Modification 1>

The method for estimating that there is a passenger or a load behind a rider is not limited to the above described case where a weight estimated by the weight estimation unit 58 is equal to or larger than the predetermined weight Wp. For example, various sensors may be disposed to make an estimation based on values output from the sensors. For example, the control device 50 may use a conventional acceleration sensor configured to detect how much the vehicle is inclined with respect to a horizontal line extending in a front-rear direction to estimate whether there is a passenger or a load behind a rider. When the control device 50 has estimated that there is a passenger or a load behind the rider, the front wheel-side target movement amount determination unit 571 may determine the front wheel-side target movement amount Lft so that the front wheel-side actual movement amount Lfa is smaller than the front wheel-side actual movement amount Lfa when there is neither a passenger nor a load behind the rider. For example, each of the maps, shown in FIG. 14A, illustrating the interrelations among a weight, the front wheel-side target length Sft, and the front wheel-side target movement amount Lft may be separated, for use as required, into two maps: a map used when there is a passenger or a load behind a rider, and another map used when there is neither a passenger nor a load behind the rider.

<Modification 2>

A conventional load sensor may be disposed at a tandem seat or a carrier as a sensor configured to estimate whether there is a passenger or a load behind a rider. While the load sensor disposed at the tandem seat or the carrier is detecting a load, the control device 50 may estimate that there is a passenger or a load behind a rider, and the front wheel-side target movement amount determination unit 571 may determine the front wheel-side target movement amount Lft so that the front wheel-side actual movement amount Lfa is smaller than the front wheel-side actual movement amount Lfa when there is neither a passenger nor a load behind the rider. For example, each of the maps, shown in FIG. 14A, illustrating the interrelations among a weight, the front wheel-side target length Sft, and front wheel-side target movement amount Lft may be separated, for use as required, into two maps: a map used when there is a passenger or a load behind a rider, and another map used when there is neither a passenger nor a load behind the rider.

<Modification 3>

A sensor for use in estimating that there is a passenger behind a rider may be an open/close detection sensor configured to detect whether steps disposed to the motorcycle 1, onto which the passenger seating on a tandem seat rests his or her feet, are open or closed. The open/close detection sensor may be an infrared-reflection sensor including a light emitting element and a light receiving element, a transmission sensor, or a sensor that receives pressure when the steps are closed and that does not receive pressure when the steps are open. When the open/close detection sensor has detected that the steps are open, the control device 50 may estimate that there is a passenger on the tandem seat, and the front wheel-side target movement amount determination unit 571 may determine the front wheel-side target movement amount Lft so that the front wheel-side actual movement amount Lfa is smaller than the front wheel-side actual movement amount Lfa when there is neither a passenger nor a load behind the rider. For example, each of the maps, shown in FIG. 14A, illustrating the interrelations among a weight, the front wheel-side target length Sft, and the front wheel-side target movement amount Lft may be separated, for use as required, into two maps: a map used when there is a passenger seating on a tandem seat, and another map used when there is neither a passenger nor a load behind a rider.

<Modification 4>

The method for estimating that there is a passenger or a load behind a rider may take one aspect described below. That is, a notification switch may be disposed to the motorcycle 1. The notification switch is used by a user to notify that there is a passenger or a load behind a rider. The control device 50 may estimate whether there is a passenger or a load behind the rider based on the notification switch.

An example of the notification switch is what is called a dial switch disposed adjacent to a speedometer, for example. The notification switch may be configured to have a knob to be turned by the user so that a riding state is selectable from among options: "solo," "tandem," and "load." The control device 50 may estimate that there is a passenger or a load behind the rider when the notification switch has been used to select "tandem" or "load."

When the control device 50 has estimated that there is a passenger or a load behind the rider, the front wheel-side target movement amount determination unit 571 may determine the front wheel-side target movement amount Lft so that the front wheel-side actual movement amount Lfa is smaller than the front wheel-side actual movement amount Lfa when there is neither a passenger nor a load behind the rider. For example, each of the maps, shown in FIG. 14A, illustrating the interrelations among a weight, the front wheel-side target length Sft, and the front wheel-side target movement amount Lft may be separated, for use as required, into two maps: a map used when there is a passenger or a load behind a rider, and another map used when there is neither a passenger nor a load behind the rider.

<Modification 5>

When estimating that there is a passenger or a load behind a rider with one of the methods described in modifications 1 to 4, the rear wheel-side target movement amount determination unit 572 may determine the rear wheel-side target movement amount Lrt so that the rear wheel-side actual movement amount Lra is larger than the rear wheel-side actual movement amount Lra when there is neither a passenger nor a load behind the rider. For example, each of the maps, shown in FIG. 14B, illustrating the interrelations among a weight, the rear wheel-side target length Srt, and the rear wheel-side target movement amount Lrt may be separated, for use as required, into two maps: a map used when there is a passenger or a load behind a rider, and another map used when there is neither a passenger nor a load behind the rider. When estimating that there is a passenger or a load behind a rider with one of the methods described in modifications 1 to 4, a map used to determine the rear wheel-side target movement amount Lrt may illustrate an interrelation where the rear wheel-side upper limit movement amount Lrmax will not be set for the rear wheel-side target movement amount Lrt, but, as a weight increases, the rear wheel-side target movement amount Lrt is increased.

<Modification 6>

In the above described embodiment, the front wheel-side target movement amount determination unit 571 and the rear wheel-side target movement amount determination unit 572 each make a determination based on a temporary weight set by the weight estimation unit 58 before the weight estimation unit 58 estimates an actual weight. This, however, should not be construed in a limiting sense. For example, the rear wheel-side target movement amount determination unit 572 may make a determination based on a temporary weight set by the weight estimation unit 58 before the weight estimation unit 58 estimates an actual weight, and the front wheel-side target movement amount determination unit 571 may not make a determination before the weight estimation unit 58 estimates the actual weight, but may make a determination, after the weight estimation unit 58 estimates the actual weight, based on the estimated weight.

<Modification 7>

The weight estimation unit 58 may always set the above described initial weight as a temporary weight to initially be set. The weight estimation unit 58 may initially set a temporary weight based on the rear wheel-side actual movement amount Lra and/or the rear wheel-side actual length Sra in a period from immediately after the motorcycle has started traveling and to when its speed reaches the increasing vehicle speed Vu. For example, a temporary weight may initially be set heavier when the rear wheel-side actual length Sra is shorter.

<Modification 8>

The number of stages for adjusting a target height via the vehicle height adjustment switch is not limited to five. The number of stages may be greater than five, such as 10 or 20, or may be lesser than five. The more the number of adjustable stages, the weight estimation unit 58 can finely decrease the rear wheel-side target length Srt, that is, can precisely estimate a weight.

DESCRIPTION OF THE REFERENCE NUMERAL

1 . . . motorcycle, 2 . . . front wheel, 3 . . . rear wheel, 10 . . . body, 11 . . . body frame, 18 . . . head lamp, 19 . . . seat, 21 . . . front fork, 22 . . . rear suspension, 50 . . . control device, 57 . . . electromagnetic valve control unit, 58 . . . weight estimation unit, 170 . . . rear wheel-side electromagnetic valve, 270 . . . front wheel-side electromagnetic valve, 195 . . . rear wheel-side relative position detection unit, 295 . . . front wheel-side relative position detection unit, 341 . . . rear wheel-side length variation amount detection unit

The invention claimed is:

1. A vehicle height adjustment device comprising:
a front wheel-side suspension device comprising:
   a front wheel-side spring disposed between a body of a vehicle and a front wheel; and
   a front wheel-side support member supporting one end of the front wheel-side spring, the front wheel-side support member being configured to move toward another one end of the front wheel-side spring to change a length of the front wheel-side spring;
a rear wheel-side suspension device comprising:
   a rear wheel-side spring disposed between the body and a rear wheel; and
   a rear wheel-side support member supporting one end of the rear wheel-side spring, the rear wheel-side support member being configured to move toward another one end of the rear wheel-side spring to change a length of the rear wheel-side spring;
a weight estimation unit configured to estimate a weight applied to the vehicle based on a length of the rear wheel-side suspension device and a movement amount of the rear wheel-side support member; and
a control unit configured to determine a rear wheel-side target movement amount representing a target movement amount for the rear wheel-side support member based on a predetermined interrelation between the weight and the rear wheel-side target movement amount so that, when the weight applied to the vehicle is less than a predetermined weight, the rear wheel-side target movement amount increases as the weight increases, and, when the weight is equal to or larger than the predetermined weight, the rear wheel-side target movement amount reaches an upper limit value, and to control the movement amount of the rear wheel-side support member and a movement amount of the front wheel-side support member so that a rear wheel-side actual movement amount representing an actual movement amount of the rear wheel-side support member reaches the rear wheel-side target movement amount,
wherein the control unit is configured to determine the rear wheel-side target movement amount based on a predetermined temporary value for the weight,
wherein the weight estimation unit is configured to increase the temporary value, even when the rear wheel-side actual movement amount has reached the rear wheel-side target movement amount, when an actual length representing an actual length of the rear wheel-side suspension device does not reach a target length,
wherein the control unit is configured to decrease the target length, even when the weight estimation unit has increased the temporary value, when the rear wheel-side target movement amount that is set anew and that corresponds to the temporary value that is set anew has reached the upper limit value,
wherein the weight estimation unit is configured to estimate the temporary value as the weight when the actual length has finally reached the target length, and
where the control unit is configured to decrease, when the weight estimated by the weight estimation unit is equal to or larger than the predetermined weight, the movement amount of the front wheel-side support member as the estimated weight increases.

2. The vehicle height adjustment device according to claim 1, wherein the control unit increases, when the estimated weight is less than the predetermined weight, the movement amount of the front wheel-side support member as the estimated weight increases.

3. The vehicle height adjustment device according to claim 2, further comprising:
a rear wheel-side length detection unit configured to detect an amount of variation in length of the rear wheel-side suspension device; and
a rear wheel-side relative position detection unit configured to detect the movement amount of the rear wheel-side support member,
wherein the weight estimation unit is configured to estimate the weight based on a value detected by the rear wheel-side length detection unit and a value detected by the rear wheel-side relative position detection unit.

4. The vehicle height adjustment device according to claim 3, wherein the weight estimation unit is configured to estimate the weight based on the movement amount of the rear wheel-side support member detected by the rear wheel-side relative position detection unit when the length of the rear wheel-side suspension device identified based on the value detected by the rear wheel-side length detection unit has reached a target length.

5. The vehicle height adjustment device according to claim 4,
wherein the front wheel-side suspension device further comprises a front wheel-side damper configured to attenuate vibration of the front wheel-side spring, and the front wheel-side support member is disposed in the front wheel-side damper, and
wherein the rear wheel-side suspension device further comprises a rear wheel-side damper configured to attenuate vibration of the rear wheel-side spring, and the rear wheel-side support member is disposed around the rear wheel-side damper.

6. The vehicle height adjustment device according to claim 3,
wherein the front wheel-side suspension device further comprises a front wheel-side damper configured to attenuate vibration of the front wheel-side spring, and the front wheel-side support member is disposed in the front wheel-side damper, and
wherein the rear wheel-side suspension device further comprises a rear wheel-side damper configured to attenuate vibration of the rear wheel-side spring, and the rear wheel-side support member is disposed around the rear wheel-side damper.

7. The vehicle height adjustment device according to claim 2,
wherein the front wheel-side suspension device further comprises a front wheel-side damper configured to attenuate vibration of the front wheel-side spring, and the front wheel-side support member is disposed in the front wheel-side damper, and
wherein the rear wheel-side suspension device further comprises a rear wheel-side damper configured to attenuate vibration of the rear wheel-side spring, and the rear wheel-side support member is disposed around the rear wheel-side damper.

8. The vehicle height adjustment device according to claim 1, further comprising:
a rear wheel-side length detection unit configured to detect an amount of variation in length of the rear wheel-side suspension device; and
a rear wheel-side relative position detection unit configured to detect the movement amount of the rear wheel-side support member,
wherein the weight estimation unit is configured to estimate the weight based on a value detected by the rear wheel-side length detection unit and a value detected by the rear wheel-side relative position detection unit.

9. The vehicle height adjustment device according to claim 8, wherein the weight estimation unit is configured to estimate the weight based on the movement amount of the rear wheel-side support member detected by the rear wheel-side relative position detection unit when the length of the rear wheel-side suspension device identified based on the value detected by the rear wheel-side length detection unit has reached a target length.

10. The vehicle height adjustment device according to claim 9,
wherein the front wheel-side suspension device further comprises a front wheel-side damper configured to attenuate vibration of the front wheel-side spring, and the front wheel-side support member is disposed in the front wheel-side damper, and
wherein the rear wheel-side suspension device further comprises a rear wheel-side damper configured to attenuate vibration of the rear wheel-side spring, and the rear wheel-side support member is disposed around the rear wheel-side damper.

11. The vehicle height adjustment device according to claim 8,
wherein the front wheel-side suspension device further comprises a front wheel-side damper configured to attenuate vibration of the front wheel-side spring, and the front wheel-side support member is disposed in the front wheel-side damper, and
wherein the rear wheel-side suspension device further comprises a rear wheel-side damper configured to attenuate vibration of the rear wheel-side spring, and the rear wheel-side support member is disposed around the rear wheel-side damper.

12. The vehicle height adjustment device according to claim 1,
wherein the front wheel-side suspension device further comprises a front wheel-side damper configured to attenuate vibration of the front wheel-side spring, and the front wheel-side support member is disposed in the front wheel-side damper, and
wherein the rear wheel-side suspension device further comprises a rear wheel-side damper configured to attenuate vibration of the rear wheel-side spring, and the rear wheel-side support member is disposed around the rear wheel-side damper.

* * * * *